United States Patent [19]

Viches et al.

[11] Patent Number: 5,801,531

[45] Date of Patent: Sep. 1, 1998

[54] APPARATUS AND METHOD FOR TESTING MAGNETIC HEADS USING TRANSLATIONAL SLIDES AND A ROTATABLE ARM

[75] Inventors: Elliot Viches, Sunnyvale; Mostafa Mahmoudian, San Carlos; Jagdeep S. Buttar, Union City; Oleg A. Gergel, Mountain View; Patrick A. Weber, Sunnyvale; Victor Rudman, Palo Alto; Harry Ray Duer, Boulder Creek, all of Calif.

[73] Assignee: Read-Rite Corporation, Milpitas, Calif.

[21] Appl. No.: 544,090

[22] Filed: Jan. 18, 1996

[51] Int. Cl.[6] .............................. G01R 33/12; G11B 5/54; G11B 21/14

[52] U.S. Cl. .................... 324/212; 360/106; 369/222

[58] Field of Search ............................ 324/212, 262; 360/105, 109, 110, 106; 369/222, 250, 265

[56] References Cited

U.S. PATENT DOCUMENTS 5,491,413  2/1996  Guzik ........................ 324/262

FOREIGN PATENT DOCUMENTS 0103581  5/1987  Japan ........................ 324/212

OTHER PUBLICATIONS

Fletcher et al., Automated multiple-head disk testing machine, IBM Technical Disclosure Bulletin, vol. 22, No. 3, Aug. 1979.

*Primary Examiner*—Jay M. Patidar
*Attorney, Agent, or Firm*—Nathan N. Kallman

[57] ABSTRACT

An apparatus for testing magnetic heads that interact with magnetic disks includes a translational slide and a rotatable arm mounted to one end of the slide. The translational slide moves the rotatable arm in a longitudinal direction parallel to the surface of a magnetic disk. The arm rotates the magnetic head to different positions relative to data tracks on the disk. A second translational slide moves the magnetic head vertically above the disk to adjust the vertical position of the head. The three movements of the head, (1) horizontally across the disk, (2) rotationally by the arm, and (3) vertically relative to the disk surface are controlled by servomechanisms. A read/write amplifier circuit is connected to the head under test. The test apparatus is controlled by a computer that interfaces with circuitry connected to the servomechanisms.

45 Claims, 19 Drawing Sheets

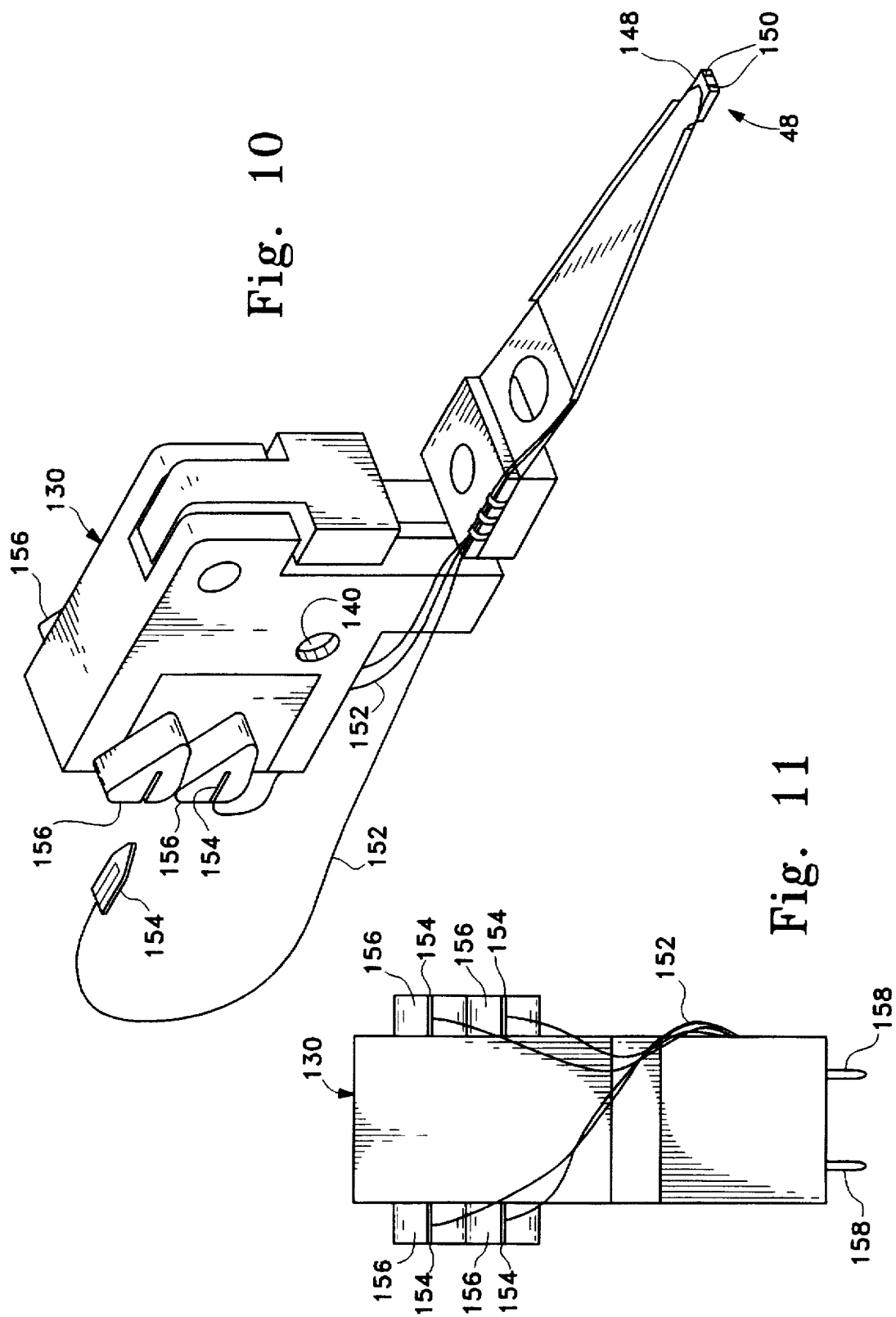

5,801,531

APPARATUS AND METHOD FOR TESTING MAGNETIC HEADS USING TRANSLATIONAL SLIDES AND A ROTATABLE ARM

FIELD OF THE INVENTION

This invention relates to testing of magnetic disk drives and in particular to testing of components related to magnetic disk drives, such as magnetic disks, magnetic heads and the like.

BACKGROUND OF THE INVENTION

A magnetic disk drive typically includes a stack of spaced apart, concentric magnetic disks mounted on a common spindle. Disposed adjacent to the stack of disks is an actuator arm assembly which comprises a plurality of arms extending into the spacings between the disks. Mounted on the distal end of each arm is a resilient load beam which in turn carries a magnetic head interacting with an associated magnetic disk.

FIG. 1 shows schematically a top plan view of a typical prior art magnetic disk drive signified by reference numeral 2. The disk drive 2 includes an arm 4 revolvable about an arm axis 6, and a magnetic disk 8 rotatable about a spindle 10. There is a multiplicity of concentric data tracks 12 registered on the surface of the disk 8. Attached to *he distal end of the arm 4 is an air bearing slider 13 carrying a magnetic head 14 which interacts with the magnetic disk 8. During normal operation, the disk 8 spins at high speed in a rotational direction 15. The aerodynamics of the moving air between the slider 13 and the surface of the disk 8 provides sufficient buoyancy to suspend the slider 13 above the disk surface. The height of the slider 13 above the disk surface is called the flying height of the magnetic head 14. To gain access to each data track 12, the arm 4 sweeps the head 14 in an arcuate locus 16 traversing the disk surface.

Attention is now directed to the angle formed by the center line through the slider 13 and the tangent line to each data track 12. This angle is defined as the skew angle of a particular data track. The tangent line to the outermost track OD is labeled $T_{OD}$, and the center line passing through the slider 13 is signified by reference numeral 18. The angle between the center line 18 and the tangent line $T_{OD}$ of the outermost track OD is defined as the skew angle $\theta_{OD}$. Likewise, the angle between the center line 18 and the tangent line $T_{ID}$ of the innermost track ID is defined as the skew angle $\theta_{OD}$. It should be noted that the skew angles $\theta_{OD}$ and $\theta_{ID}$ may be different in magnitude and polarity, depending upon factors such as the arm length and relative position of the arm 4 with respect to the disk 8. With the center line 18 as reference, the skew angle $\theta_{ID}$ is negative (measured counterclockwise) while the skew angle $\theta_{OD}$ is positive (measured clockwise). With the arm axis 6 relatively far away from the spindle 10, the angle $\theta_{OD}$ is also smaller that the angle $\theta_{ID}$ in absolute value. For data tracks in between, the polarities and angular magnitudes range between these extremes.

The skew angle is of significant importance in the design of a magnetic disk drive. To begin with, the skew angle dictates the angular orientation of the slider 13 with respect to the air stream while the disk 8 is spinning in the direction 15. Accordingly, the dynamic air pressures exerted on the slider 13 are different at different data tracks. As a result, the slider 13 carrying the magnetic head 14 flies at different heights above the disk surface at different skew angles. However, signal intensity sensed by the head 14 during the read mode, or written onto the disk 8 during the write mode, is a strong function of the flying height. Therefore, performance of the magnetic head 14 varies at different skew angles.

To compound the situation further, the radial distance of the magnetic head 14 away from the spindle center 20 also plays an important role in the determination of the flying height. While the disk 8 is spinning, the outermost track OD experiences higher linear velocity relative to the innermost track ID. Dynamic pressure exerted on the slider 13, also a function of linear velocity, is correspondingly higher at the outermost track OD compared to the innermost track ID. In conjunction with the skew angle factors, the flying height of the magnetic head 14 is indeed difficult to predict theoretically.

For the above reasons, in the design and manufacturing of magnetic disk drives, there is a need for a tester which is capable of duplicating the skew angle and the radial distance of the magnetic head 14 in each of the data tracks 12 accurately.

Various disk drive testers have been proposed in the past. In U.S. Pat. No. 4,902,971, entitled "Magnetic Head and Disc Tester Employing Pivot Arm on Linearly Movable Slide", issued Feb. 20, 1990, a magnetic disk and head tester is disclosed. The tester includes an arm having a proximal end fixedly secured onto a translational slide, and a distal end attached with a magnetic head. To operate the tester, the skew angle of the outermost and innermost tracks need first be determined. Thereafter, the distance between the slide and the disk spindle, and the angular orientation of the arm are all correspondingly adjusted, such that the arm forms the predetermined skew angles at the outermost and innermost tracks. The arm is then fixedly tightened onto the slide. Linear motion of the slide carrying the arm traversing the disk is utilized to simulate the rotational motion of the arm of a disk drive. Errors can be induced for data tracks located between the outermost and innermost tracks. The situation would be more aggravated with smaller disk drives having shorter arms which sweep arcs of smaller radii of curvature.

To rectify this problem, another tester has been proposed. In U.S. Pat. No. 5,254,946, entitled "Magnetic Head and Disk Tester with Head Centrally Mounted on Radially-Moving, Rotatable Platform that Surrounds Disk", issued Oct. 19, 1993, the tester includes a testing arm fixedly attached to a rotatable housing which is also capable of linear movement. The disk under test is positioned underneath the housing and the arm. Prior to usage, with the aid of a charged coupled device (CCD) camera, the magnetic head must first be manually and accurately aligned with the center of rotation of the housing. Pretest preparation of this type of setup is time consuming. Moreover, for the testing of different disks, considerable steps of mounting and demounting are involved. Testers of this type are not suitable for mass production environments.

Still, there are other testers employing X-Y manipulators to gain access to the different data tracks on magnetic disks. Testers of this type involve very complicated head traveling patterns and are not easy to operate.

None of the prior art testers provide any features that are suitable for high throughput operation. There is a need for magnetic head and disk testers that can fulfill fast development turnaround and high volume production requirements.

SUMMARY OF THE INVENTION

It is an object of the invention to provide a magnetic head and disk tester that is accurate, capable of switching to different testing setups conveniently and swiftly, designed to involve minimal human intervention and machine downtime, adaptable to interface a wide variety of logic families, and suitable for high throughput operations.

Another object is to reduce testing costs in production and design of magnetic heads and disks.

The test apparatus of the present invention includes a rotational arm having a proximal end pivotally mounted to a translational slide, and a distal end attached with a magnetic head. Both the arm and the slide are operationally rotatable and slidable, respectively, above a tester base, thereby allowing the magnetic head to gain access to any location on a magnetic disk instantly and accurately.

In one embodiment, a magnetic head is attached to the distal end of the arm via a vertical slide which is installed at the arm's end and is slidable in a linear direction substantially vertical to the magnetic disk. The vertical slide can lift the magnetic head to any elevation above the magnetic disk.

In another embodiment, a detachable module carrying the magnetic head and an amplifier circuit is releasably mounted to the vertical slide. This feature allows the magnetic head to be pre-wired before usage, thereby curtailing the tester downtime. Moreover, with the amplifier disposed adjacent to the head on the detachable module, signal wiring distance is reduced, thereby reducing the probability of noise occurrence.

Wiring the magnetic head having thin signal lead wires is normally a time-consuming and cumbersome process. In accordance with this invention, a novel rotary wire connector is installed on the arm to facilitate this task. The wire connector includes a thumb wheel and a plurality of cams fixedly mounted on a common shaft adjacent to a housing. Each cam is engaged to stretch a spring at a particular rotational angle of the shaft. While the spring is stretched, a thin wire can be inserted into the spring windings. When the thumb wheel rotates to other angles and the spring restores to its normally compressed state, the wire is tightly trapped in the spring and makes electrical connection.

The amplifier circuit linked to the magnetic head is also uniquely designed. The amplifier circuit comprises a data writing section and a data reading section. The data writing section includes a multiplier interfacing with a linear current drive. Voltage levels of any logic families are fully acceptable by the amplifier circuit. The multiplier scales down the input voltage levels before directing signals to the current drive for current amplification. The linear current drive has a wide linear range for reducing signal distortion. The data reading section comprises at least one variable gain amplifier.

The testing apparatus of the invention is preferably computer controlled. Servomechanisms can be installed to the rotational arm and the translational and vertical slides for precise angle and distance monitoring.

The testing apparatus is designed to be a self-contained testing system requiring minimal human intervention and is especially suitable for large testing throughput environment.

These and other features and advantages of the invention will be apparent to those skilled in the art from the following detailed description, taken together with the accompanying drawings, in which like reference numerals refer to like parts.

BRIEF DESCRIPTION OF THE DRAWINGS

FIG. 10 is a magnetic head transfer assembly of the rotatable arm of FIGS. 8 and 9 illustrating the wiring of the magnetic head;

FIG. 11 is a rear plan view of the magnetic head transfer assembly shown in FIG. 10;

DETAILED DESCRIPTION OF THE INVENTION

General Architecture

Figure 1:
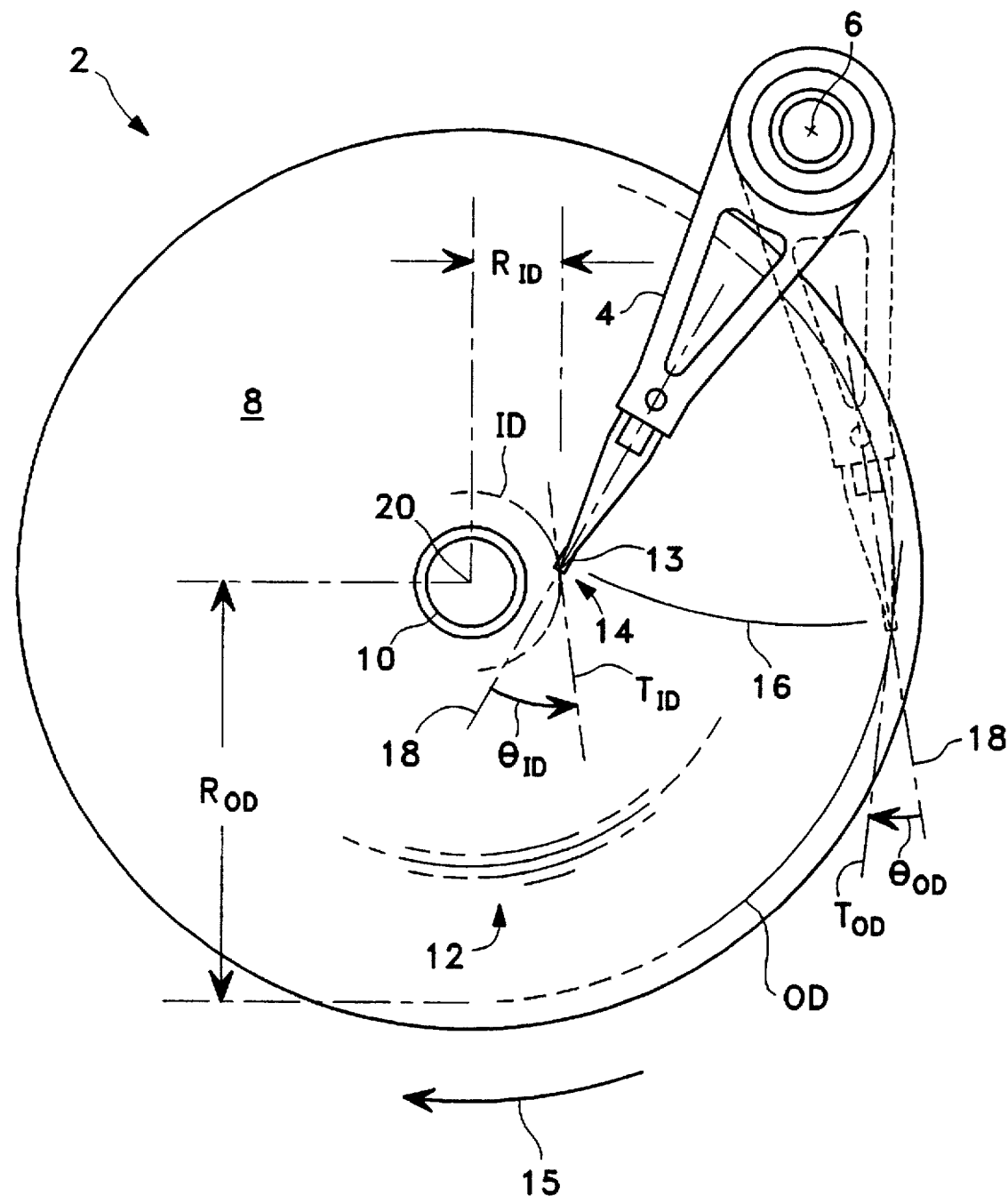
FIG. 1 is a top plan view of a disk drive having a rotatable arm carrying a magnetic head interacting with a magnetic disk.
Figure 2:
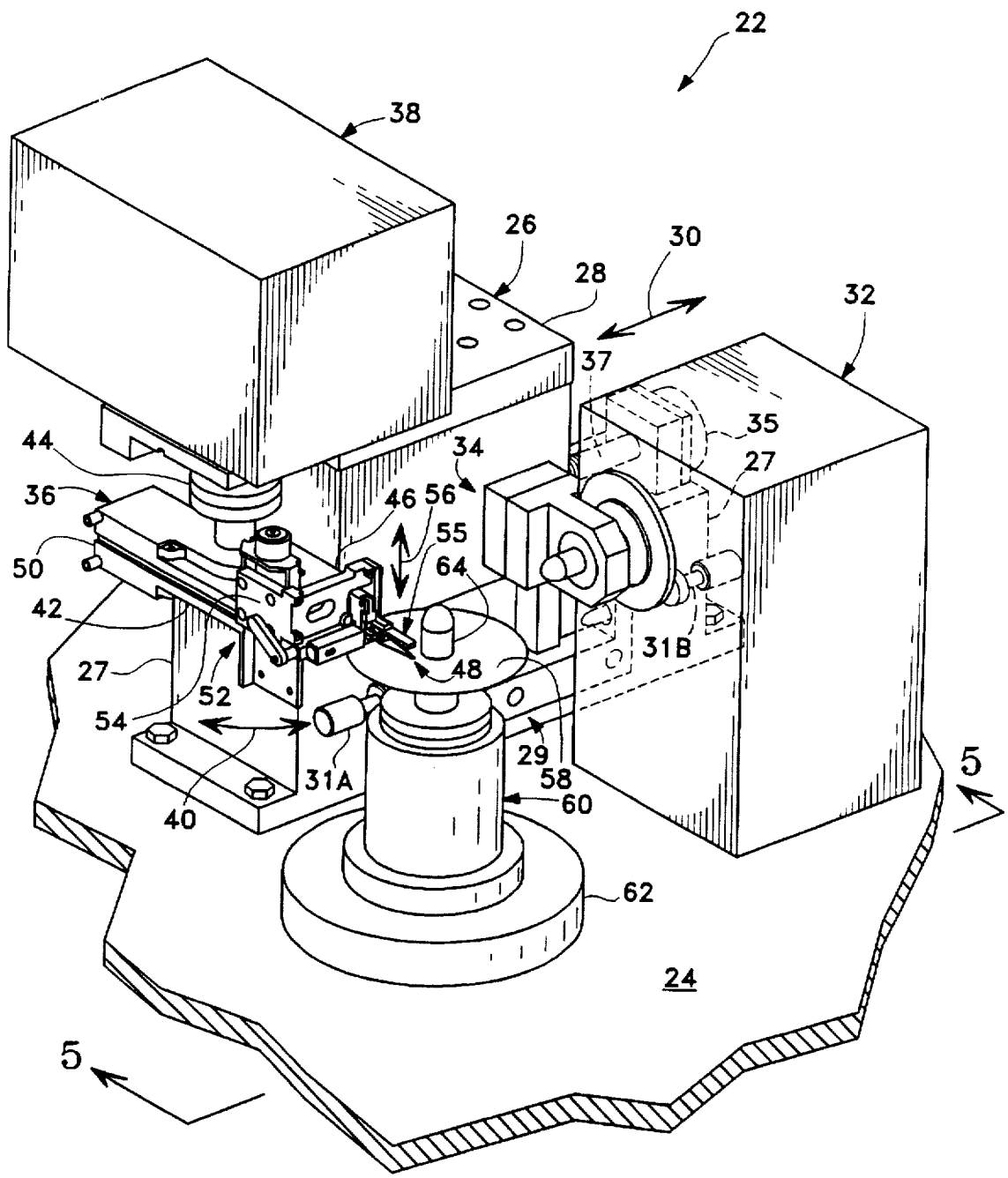
FIG. 2 is an isometric view of the testing apparatus of the invention illustrating the relative positions of the mechanical components.
Figure 3:
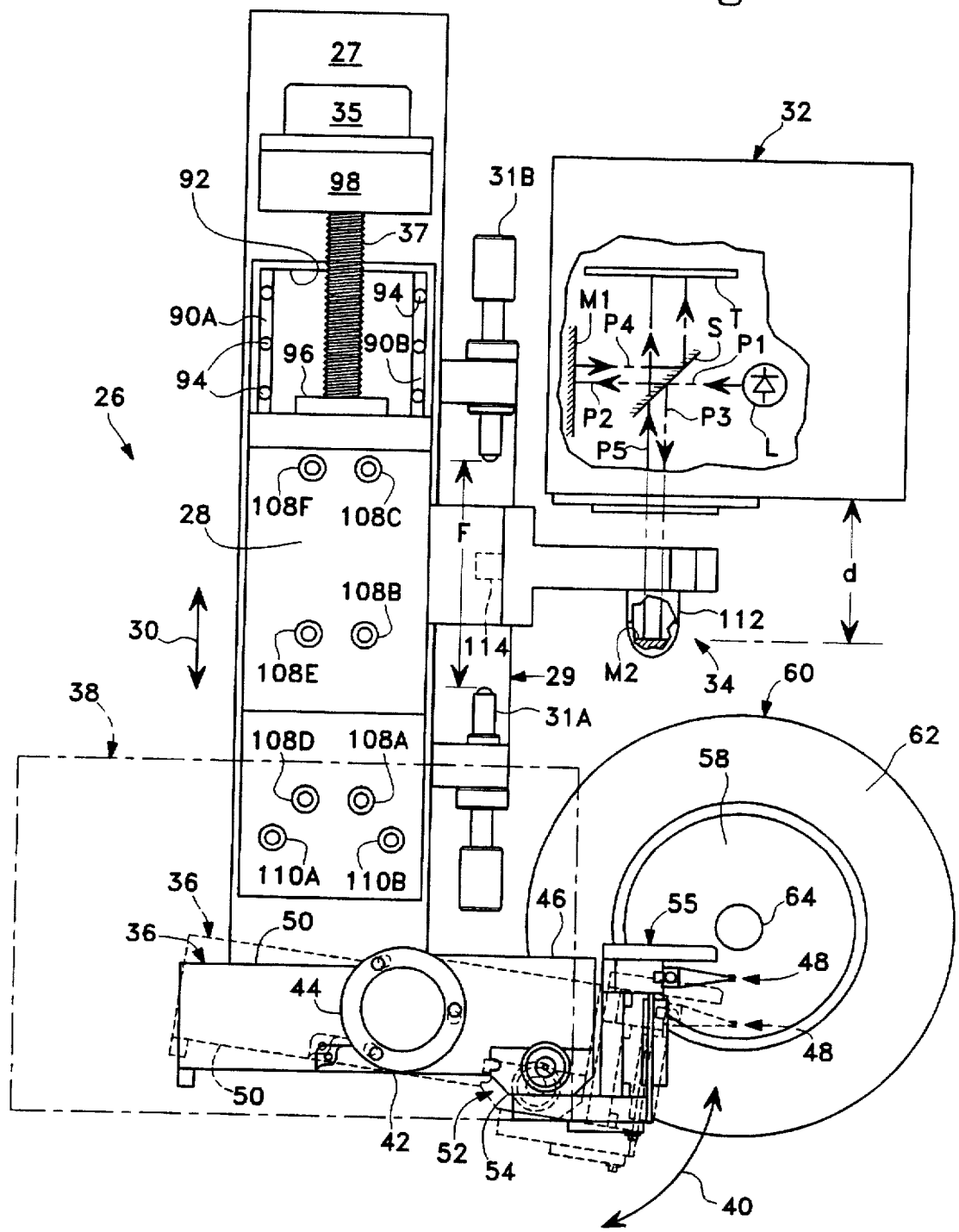
FIG. 3 is a top plan view of the testing apparatus shown in FIG. 2.

Reference is made to FIGS. 2 and 3 which show the testing apparatus of the invention generally signified by reference numeral 22. For the sake of clarity in illustration, electrical wirings and circuit boards are removed in FIGS. 2 and 3. The electrical aspects of the testing apparatus 22 will be described later in the specification.

The testing apparatus 22 includes a base 24 which comprises a rigid surface. An example is a metal slab of sufficient rigidity and thickness. Alternatively, the base 24 can be equipped with shock absorbing means (not shown).

On top of the base 24 is first translational means 26, such as a translational slide 28 slidable on a stationary platform 27 in a linear direction signified by reference numeral 30. The linear movement of the slide 28 is made possible by a stationary DC servo motor 35 driving a lead screw 37 through the slide 28. A linear servomechanism 32, directly coupled to the slide 28, is implemented for control of the linear movement of the slide 28, via a feedback assembly 34.

Adjacent to the slide 28 but fixedly mounted to the stationary platform 27 is a calibration assembly 29 having calibration screws 31A and 31B located at both ends. The calibration assembly 29 is installed for the initial calibration of the linear servomechanism 32 prior to usage.

Pivotally attached to the translational slide 28 is a rotatable arm 36. There is another servomechanism 38 coupled to the rotatable arm 36 for controlling the rotational movement of the arm 36 in the rotational direction 40. The arm 36 includes a proximal end 42 which is pivotally mounted to the slide 28 through a shaft 44, and a distal end 46 which is affixed with a magnetic head 48. Optionally, a counterweight 50 can be integrally attached to the proximal end 42 of the arm 36 for the purpose of stabilizing the rotational movement 40.

Disposed between the magnetic head 48 and the distal end 42 of the rotatable arm 36 is a second translational means or elevating means 52, such as a vertical slide 54 which is movable in a vertical direction 56 (FIG. 2). The vertical slide 54 includes a servomechanism 55 which allows the magnetic head 48 to be adjustably moved above the surface of a magnetic disk 58.

A disk stand 60 is fixedly installed on the top of the base 24. The disk stand 60 comprises a stand base 62 carrying a revolvable spindle 64, which in turn is supporting the magnetic disk 58.

Figure 4:
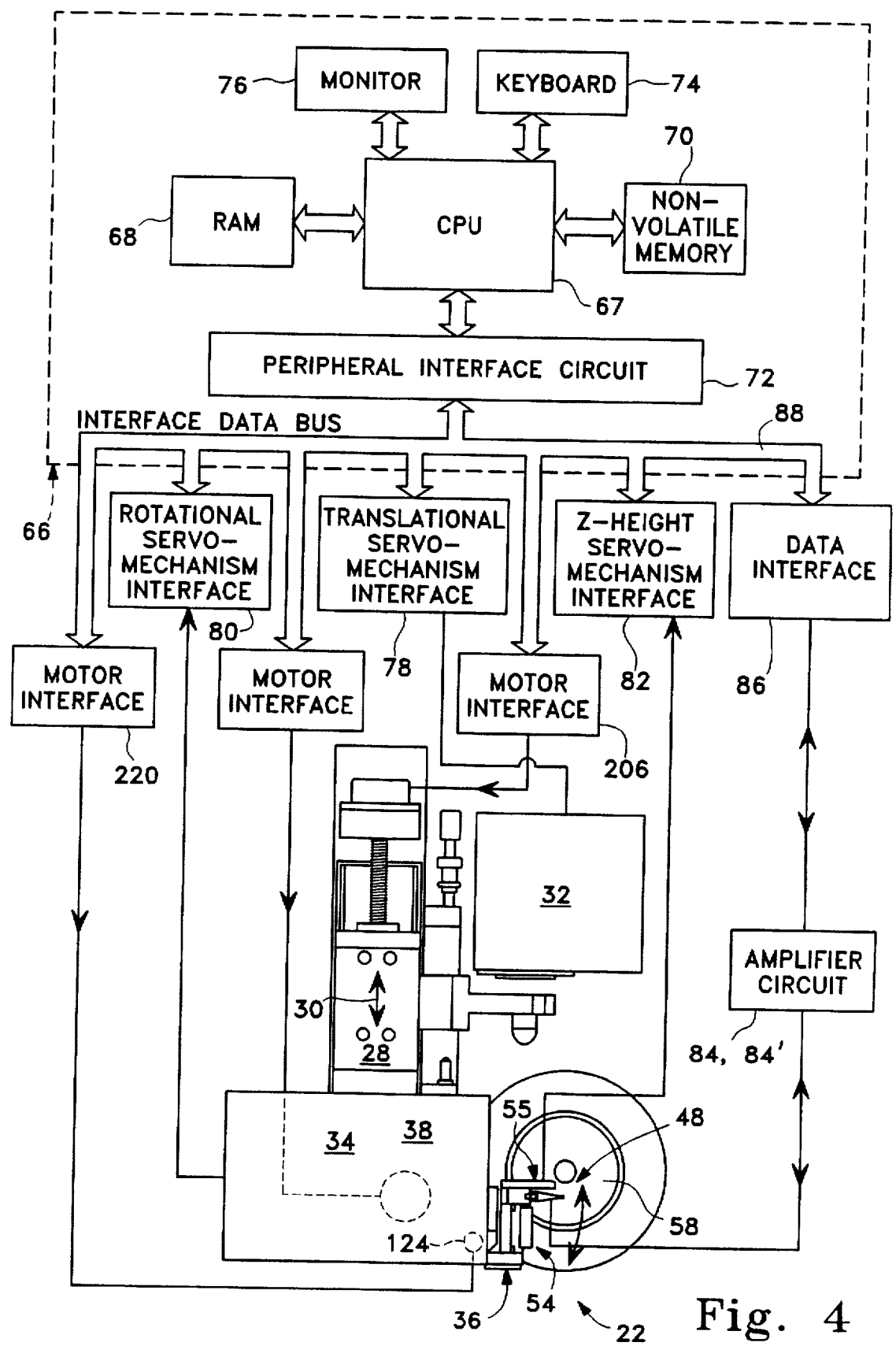
FIG. 4 is a block diagram schematic showing the operational control of the testing apparatus of FIGS. 2 and 3.

FIG. 4 is a block diagram showing the operational control of the testing apparatus 22. The main control is a computer generally designated by the reference numeral 66. The computer 66 can be a typical computer having a CPU 67 linked to a volatile memory, such as a RAM circuit 68 and a nonvolatile memory, such as a hard disk 70. The CPU 67 is also tied to a peripheral interface circuit 72 which communicates with other circuits external to the computer 66 via an interface data bus 88. Human interaction with the computer is made possible through a keyboard 74 and a video monitor 76.

As mentioned before, the key mechanical components of the apparatus 22 are operationally movable during the testing process. Specifically, during testing, the slide 28 is freely slidable in the direction 30, the rotatable arm 36 is freely rotatable in the direction 40, and the vertical slide 54 is movable in the direction 56 (FIGS. 2 and 3). The directions of movement 30, 40 and 56 are all controlled by the respective servomechanisms 32, 38 and 55, which in turn are controlled by the respective interface circuits 78, 80 and 82. There is also a read-write amplifier circuit 84 directly connected to the magnetic head 48. The amplifier circuit 84 is controlled by the data interface circuit 86 which is linked to the interface data bus 88.

The operation of the testing apparatus 22 requires a considerably lesser degree of human adjustment and intervention than prior art testers. For example, during testing, variable data, such as the required skew angles and the radial track distances, can be fed into the computer 66 through the keyboard 74. Specific testing routines can be loaded from the nonvolatile memory 70 into the RAM 68, and the required testing processes would be executed automatically by the CPU 67. The resulting testing data sensed by the amplifier circuit 84 are sent back to the CPU 67 via the data interface bus 88 for evaluation or for statistical analysis.

The following paragraphs describe the methods of operation and various components of the testing apparatus 22 in detail.

Principles of Operation

Figure 5:
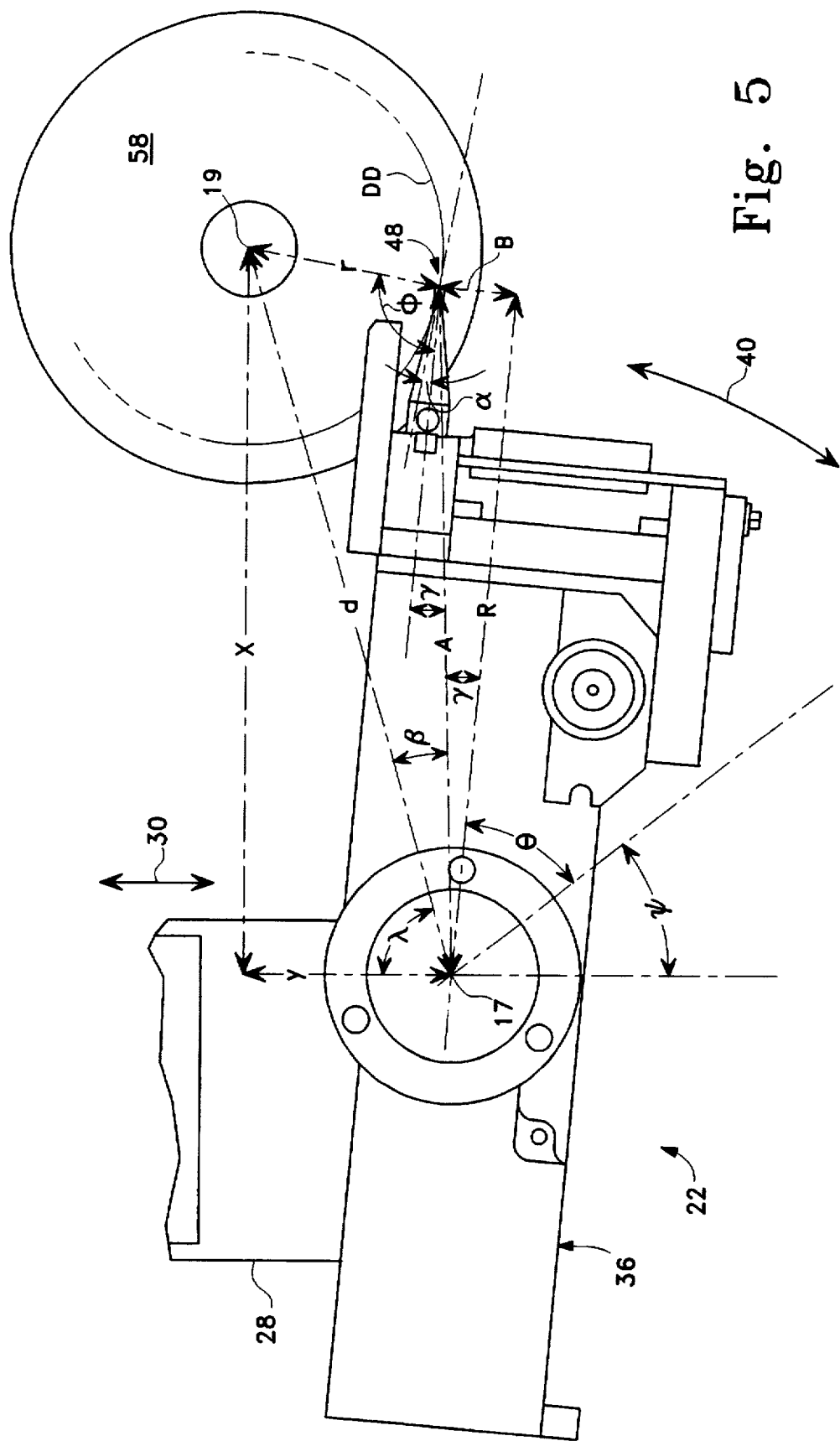
FIG. 5 is a schematic showing the geometrical relationships between the tester components and the magnetic disk.

Reference is now directed to FIG. 5 which shows the geometrical relationships of the translational slide 28 and the rotatable arm 36 with respect to the magnetic disk 58. The operational movements of the slide 28 and the arm 36 of the testing apparatus 22 are herein described.

Suppose the testing apparatus 22 needs to test a data track DD on the magnetic disk 58. In an actual disk drive, each data track is characterized by a skew angle a and a radial distance r, as explained above. To simulate the real disk drive operation, the testing apparatus 22 must orientate the magnetic head 48 at the same skew angle $\alpha$, and position the head 48 at the same radial distance r away from the center of the disk 19. However, the arm length A of the testing apparatus 22 is different from the length of the real disk drive arm. Furthermore, the center of rotation 17 of the arm 36 of the tester 22 is possibly located differently from that of the actual disk drive with respect to the disk center 19. The testing apparatus 22 of the invention solves these problems by automatically calculating the necessary translational distance y and the rotational angle $\theta$, based on the given geometry, in conjunction with the required skew angle a and the radial distance r. Once the values y and $\theta$ are computed, the testing apparatus 22 translates the slide 22 at the distance y and rotates the arm 36 at the angle $\theta$ and thereafter performs the testing.

In this embodiment, the calculations of the translational distance y and the rotational angle $\theta$ are performed by the computer 66 (FIG. 4). To equip the computer 66 for these tasks, two mathematical expressions must first be derived, namely, the first and second expressions that define the translational distance y and the rotational angle $\theta$, respectively, as functions of the skew angle $\alpha$, the radial distance r and the existent geometrical arrangement.

FIG. 5 shows an exemplary arrangement of the slide 28 and the rotatable arm 36 with respect to the magnetic disk 58. For explanation purpose, this geometrical configuration is adopted for the following illustration. From basic trigonometry and with reference to FIG. 5, the following equations can be derived:

$$\phi = \frac{\pi}{2} - \alpha \tag{1}$$

$$d = \sqrt{r^2 + A^2 - 2rA\cos(\phi + \gamma)} \tag{2}$$

$$\beta = \sin^{-1}\left[ r\frac{\sin(\phi + \gamma)}{d} \right] \tag{3}$$

$$y = \sqrt{d^2 - X^2} \tag{4}$$

$$\lambda = \sin^{-1}\left( \frac{X}{d} \right) \tag{5}$$

$$\theta = \pi - \psi - \gamma - \beta - \lambda \tag{6}$$

$$A^2 = R^2 + B^2 \tag{7}$$

$$\gamma = \tan^{-1}\left( \frac{B}{R} \right) \tag{8}$$

where:

$\alpha$ = skew angle of the magnetic head with respect to the data track;

r = radial distance of the magnetic head to the center of the magnetic disk;

X=separation between the rotation center of the arm and the center of the magnetic disk along the x-direction;

d=distance between the rotation center of the arm and the center of the magnetic disk;

$\psi$=an arbitrary starting angle;

$\lambda$=angle between the line joining the centers of the arm of rotatation and magnetic disk with respect to the y direction;

R=the perpendicular distance from the center of the arm rotation to the tip of the magnetic head;

B=the perpendicular distance from the tip of the head to the line R;

A=the distance between the center of the arm rotation to the magnetic head; and $\beta$, $\phi$ and $\gamma$ are transitory angles.

Solving the eight simultaneous equations above, the translational distance y and the rotational angle $\theta$ can be expressed as follows:

$$y = \sqrt{r^2 + R^2 + B^2 - X^2 + 2r\sqrt{R^2+B^2}\ \sin\left[-\alpha + \tan^{-1}\left(\frac{B}{R}\right)\right]} \quad (9)$$

$$\theta = \pi - \psi - \tan^{-1}\left(\frac{B}{R}\right) - \beta - \lambda \quad (10)$$

where:

$$\beta = \sin^{-1}\left[r \frac{\cos\left[\alpha - \tan^{-1}\left(\frac{B}{R}\right)\right]}{\sqrt{r^2 + R^2 + B^2 + 2r\sqrt{R^2+B^2}\ \sin\left[-\alpha + \tan^{-1}\left(\frac{B}{R}\right)\right]}}\right] \quad (11)$$

and, $$\lambda = \sin^{-1}\left[\frac{X}{\sqrt{r^2 + R^2 + B^2 + 2r\sqrt{R^2+B^2}\ \sin\left[-\alpha + \tan^{-1}\left(\frac{B}{R}\right)\right]}}\right] \quad (12)$$

Equation (9) now reduces to a function dependent upon the skew angle $\alpha$, the radial distance r and the fixed geometrical parameters of the apparatus 22. Likewise, with the transitory angles $\beta$ [equation (11)] and $\lambda$ [equation (12)] substituted into it, equation (10) also depends on the skew angle $\alpha$, the radial distance r and the fixed geometrical parameters of the apparatus 22. Equations (9)–(12) can be programmed into the computer 66. Once the skew angle $\alpha$ and the radial distance r are entered, the computer 66 would calculate the sought after values y and $\theta$ automatically.

Figure 6:
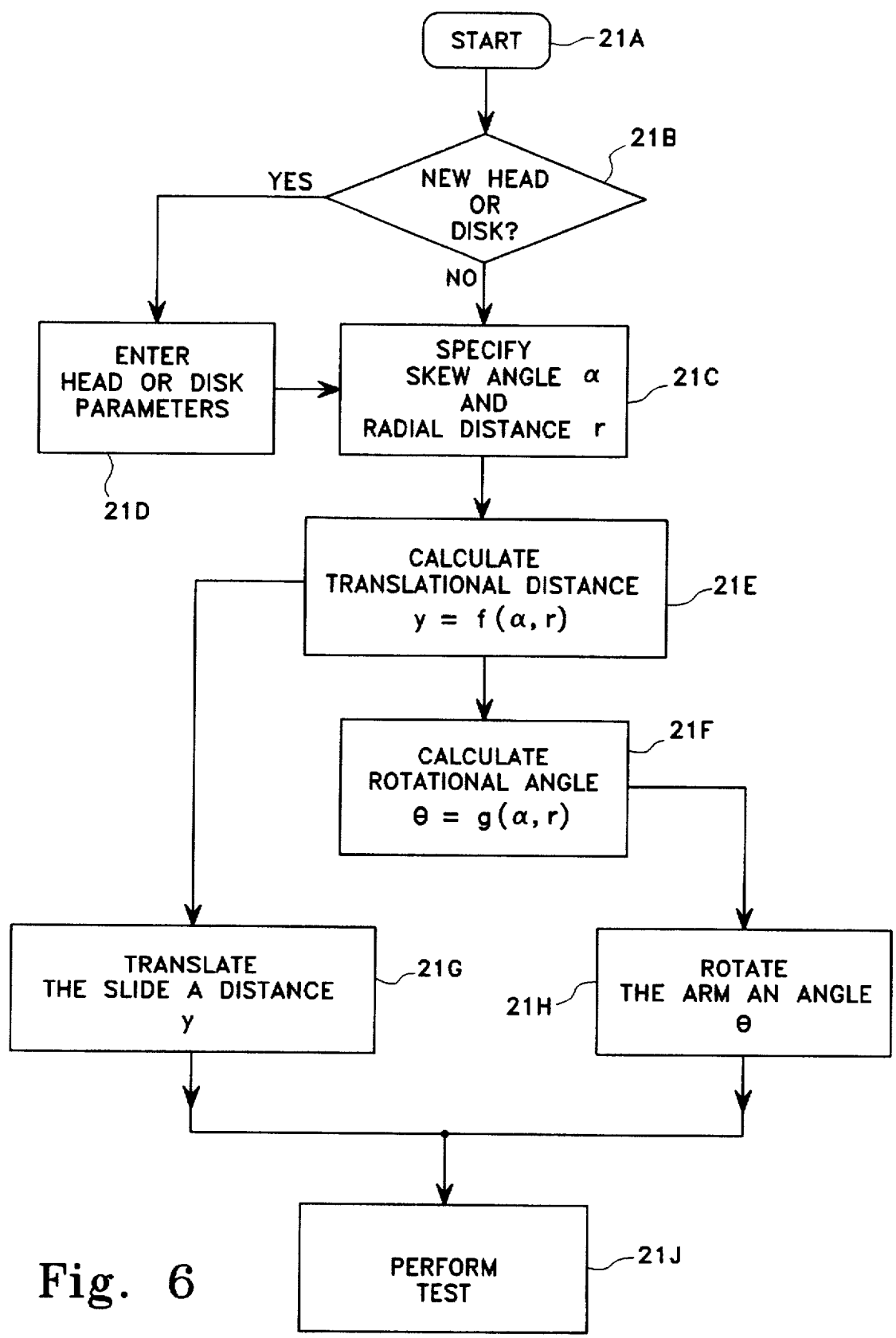
FIG. 6 is a flow diagram illustrating the algorithm used to direct the movements of the mechanical components of the testing apparatus shown in FIGS. 2–5.

FIG. 6 is a flow chart illustrating the algorithm used by the computer 66 to direct the testing apparatus 22 for the testing of each data track.

The flow chart of FIG. 6 can best be explained in accompany with the operational schematic of FIG. 4. Prior to any testing as shown in block 21A, equations (9)–(12) are programmed into the RAM circuit 68, either via the nonvolatile memory 70 or manually via the keyboard 74. Then the CPU 67 asks for whether the testing is for a new head or a disk as shown in the decision block 21B. If the answer is negative, the testing process proceeds to block 21C which requests for the skew angle a and the radial distance r. Thereafter, the CPU 67 calculates the translational distance y from the mathematical function y=f($\alpha$,r), which in essence is the equation (9), as shown in block 21E. The calculation of the rotational angle $\theta$ also follows as shown in step 21F. The mathematical function used this time is $\theta$ =g($\alpha$,r) which basically includes equations (10)–(12). Based on the computational result of block 21E, the CPU 67 directs the motor interface circuit 206 via the interface data bus 88 to advance the translational slide 28 a distance y, as shown in block 21G. In a similar manner, from the calculated result of block 21F, the CPU 67 instructs the motor interface circuit 211 to rotate the rotatable arm 36 an angle $\theta$, as shown in block 21H. When the magnetic head 48 attains the proper arm translational distance y and the arm rotational angle $\theta$ corresponding to the correct skew angle $\theta$ and radial distance r of an actual disk, the apparatus 22 can perform the test as shown in step 21J.

Returning now to block 21B in FIG. 6, suppose a new disk or head needs to be tested. The new disk or head is simply mounted onto the apparatus 22. New parameters such as the relative positions or dimensions of the new head or disk are entered into the computer 66 as shown in block 21D. The testing then proceeds and continues to block 21C as previously described. It should be emphasized that by virtue of calculating the translational distance y and the rotational angle $\theta$ via mathematical transformation of multiple variables $\alpha$ and r in advance of movements, the arm 36 and the slide 28 can rotate and move with flexibility and agility. This is in sharp contrast with most prior art testers, such as the tester disclosed in the aforementioned U.S. Pat. No. 5,254,946, where the movement algorithms associated with the rotatable housing are one dimensional. That is, the magnetic head translates and rotates solely as a function of the radial distance or skew angle, respectively, but not both. As a consequence, designs of this type places considerable restriction the mobility of the movable parts. This partly contribute to the substantial mounting and dismounting involvement during disk changes, and the stringent head alignment requirement prior to testing.

The testing apparatus of the invention involves no such inconvenience.

The Translational Slide

Figure 7:
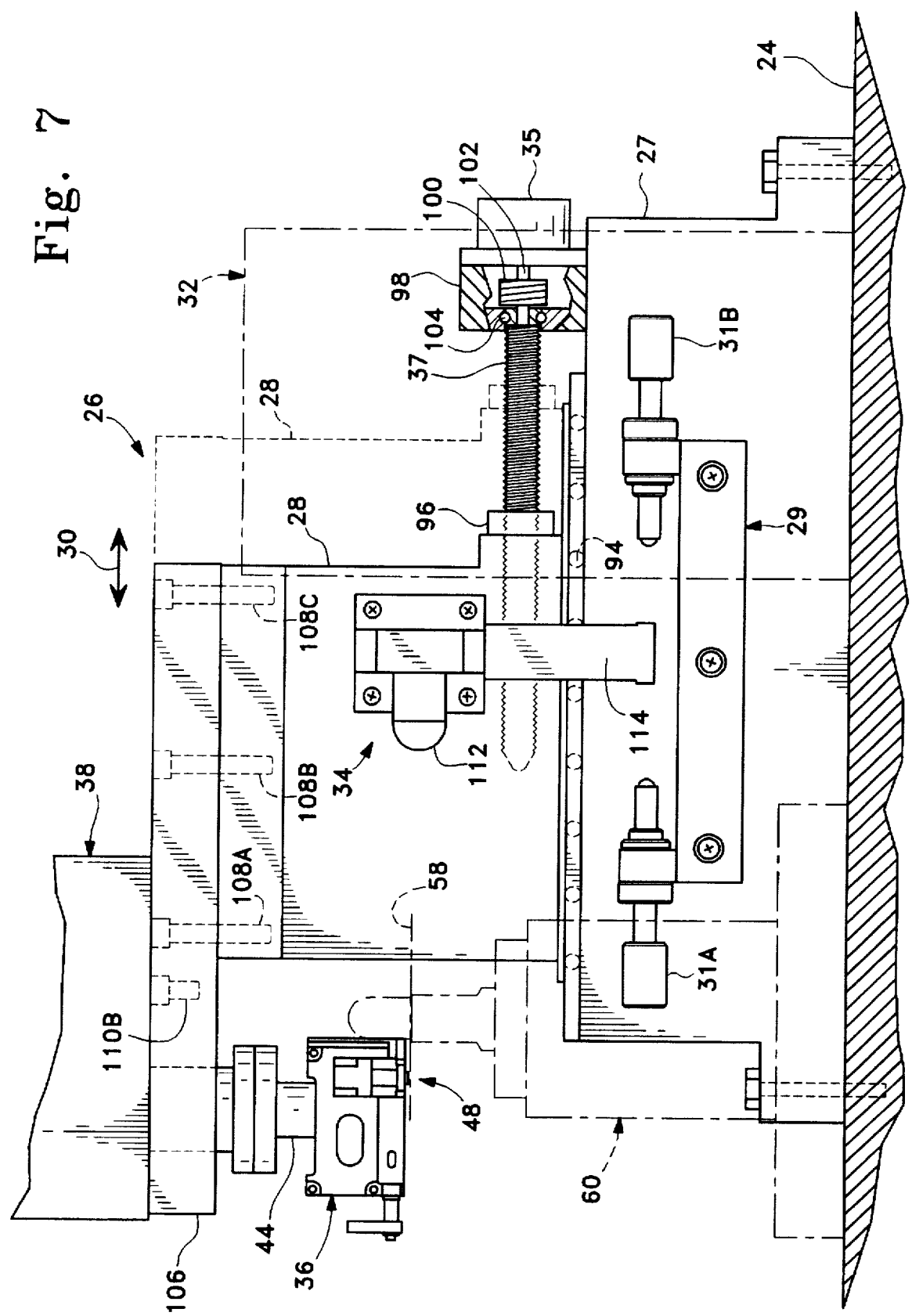
FIG. 7 is a side plan view of the testing apparatus of FIG. 2 having the disk stand and the linear servomechanism illustrated in ghost lines revealing the translational slide and the calibration assembly.

Shown in FIG. 7 is a side plan view taken along line 7—7 of FIG. 2. The disk stand 60 and the linear servomechanism 32 are shown in phantom lines, thereby revealing first translational means 26 unobstructed.

With reference to FIGS. 3 and 7, first translational means 26 in this embodiment includes a slide 28 slidably disposed atop the stationary platform 27. There is a trough 92 (FIG. 3) having a pair of guide rails 90A and 90B upon which the slide 28 is slidably resting. Partially embedded inside the guide rails 90A and 90B is a plurality of ball bearings 94 which facilitate the linear movement 30 of the slide 28.

The linear movement of the slide 28 in the direction 30 is achieved by a DC servo 35 driving the lead screw 37 which engages the slide 28 through a nut 96 attached to the slide 28. The servo motor 35 is fixedly attached to a bracket 98 which in turn is permanently anchored onto the stationary platform 27. The bracket 98 is shown partially fragmentary to reveal a flexible coupler 100 connecting the motor shaft 102 and the lead screw 37. The flexible coupler 100 corrects misalignment, reduces vibrations and enables a smoother rotational movement of the lead screw 37 at the distal end inside the slide 28. There are also ball bearings 104 encompassing the lead screw 37 to assist the rotational movement. As arranged, when the motor 35 is energized, the lead screw 37 spins along with the coupler 100 and the motor shaft 102. The screw 37 engaging the nut 96 drives the slider 28 along the linear direction 30. The slide 28 illustrated in hidden lines shown in FIG. 7 portrays an alternative position of the slide 28 glided along the rails 90A and 90B.

Atop the slide 28 is an extension plate 106 (FIG. 7) which is attached to the rotational servomechanism 38. The extension plate 106 is bolted onto the slide 28 via bolts 108A–108F. Likewise, the rotational servomechanism 38 is bolted onto the extension plate 106 through bolts 110A and 110B (FIG. 3).

The rotational servomechanism 38 and the rotatable arm 36 are connected together through the shaft 44. The motor (not shown) inside the rotational servomechanism 38 carries and moves the arm 36 in the rotational direction 40 (FIG. 3). Arranged in this manner, the magnetic head 48 affixed to the distal end 46 of the arm 36 can traverse the magnetic disk 58 on the top of the disk stand 60.

The linear feedback assembly 34 is fixedly attached to the sidewall of the slide 28. The feedback assembly 34 includes a laser reflector 112 and a reference extension 114. The calibration assembly 29, having calibration screws 31A and 31B, are also fixedly outrigged onto the stationary platform 27. The reflector 112, the extension 114, the calibration assembly 29 with the screws 31A and 31B are installed for the purpose of calibrating the servomechanism 32 prior to usage.

The Rotatable Arm

Figure 8:
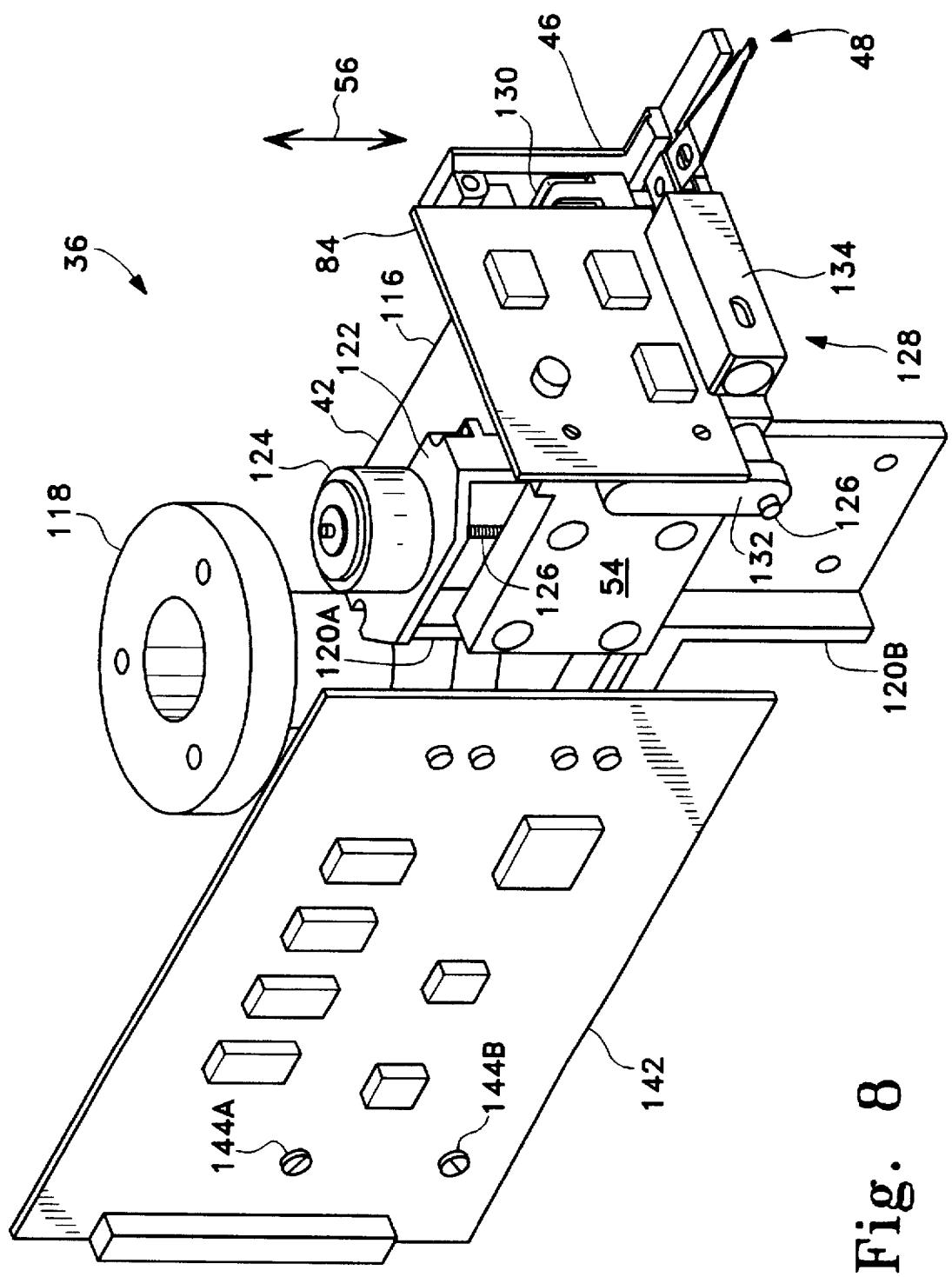
FIG. 8 is an isometric view of a first embodiment of an assembled rotatable arm.
Figure 9:
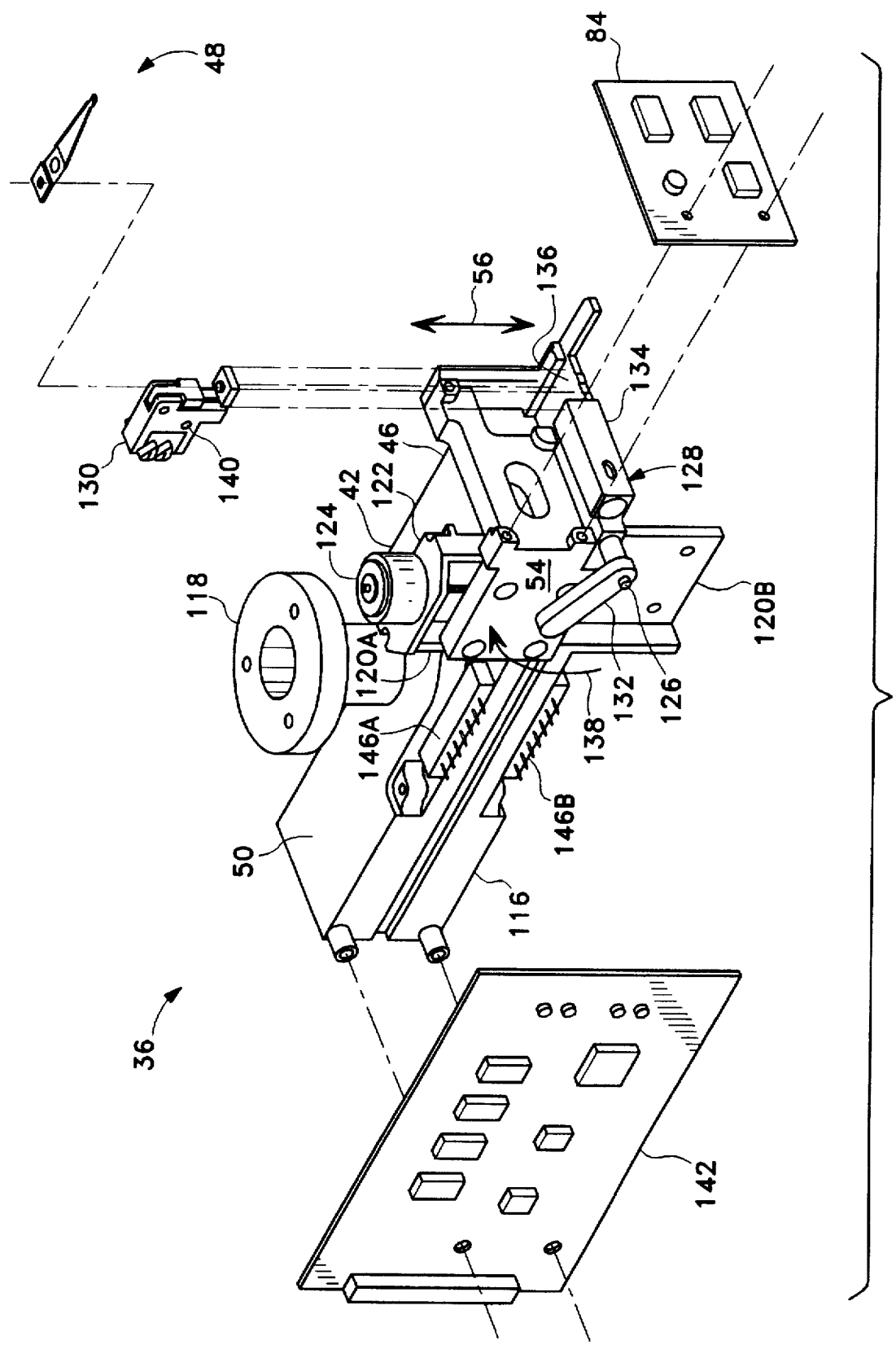
FIG. 9 is an exploded view of the rotatable arm shown in FIG. 8.

FIGS. 8 and 9 show a first embodiment of the rotatable arm 36 in further detail. FIG. 8 is an assembled drawing of the arm 36 and FIG. 9 is an exploded view showing the relevant parts made up of the arm 36. The arm 36 includes an arm body 116 having a proximal end 42 and a distal end 46. At the proximal end 42 is integrally attached a shaft coupler 118, which is coupled to a motor (not shown) inside the rotational servomechanism 38 for rotational movement. Optionally, a counterweight portion 50 can be integrally annexed to the proximal end 42 of the arm 36 to effectuate more balanced rotational movements.

There are two flanges 120A and 120B integrally formed with the arm body 116. As shown in FIGS. 8 and 9, the upper flange 120A is mounted to a lead screw housing 122 which encompasses a lead screw 126. The lead screw 126 has one end engaging the vertical slide 54 and another end connected to a stepper motor 124. When the motor 124 is activated, the motor 124 spins the lead screw 126 which in turn drives the vertical slide 54 along the vertical direction 56. The magnetic head 48, being affixed to the vertical slide 54, moves along with the slide 54 in the direction 56. It should be appreciated that another slide, similar to the vertical slide 54, can also be assembled onto the lower flange 120B in a similar fashion carrying another magnetic head, such that two magnetic heads can interact with a double-sided magnetic disk.

At the distal end 46 of the arm 36 and on the vertical slide 54 is a release mechanism 128, which is installed for accommodating a head transfer assembly 130. The release mechanism 128 comprises a lever 132 pivoted about a lead screw 126 behind a slide block 134. To lock the head transfer assembly 130 into position, the assembly 130 is first placed in the reserved slot 136 (FIG. 9). The lever 132 is then pulled upwardly in the direction 138, thereby advancing the lead screw 126 and the slide block 134 toward the head transfer assembly 130. The tip of the screw (not shown) then penetrates into the opening 140 of the assembly 130, and coupled with the compressive force of the slide block 134 against the assembly 120, the head assembly 120 is tightly secured in place.

The read-write amplifier 84 can be proximally disposed adjacent to the head transfer assembly 130, such that sensed signals detected by the magnetic head 48 are amplified first before sending signals to other circuitries over a long distance for processing. In this embodiment, the amplifier circuit 84 is screwed onto the front part of the vertical slide 54. Arranged in this manner, the chance of noise contamination on the preliminarily sensed signal is substantially reduced. Optionally, other circuits, such as a high frequency buffering circuit 142, can be secured to the arm body 116 via screws 144A and 114B, and connectors 146A and 146B.

Modern day magnetic heads are fabricated at a miniaturized scale. Magnetic heads must also electrically communicate with other circuits displaced at a distance from the head in a tester. However, the wires leading to the magnetic heads are normally exceedingly small in diameter. Handling such wires in setting up the testing processes is a time-consuming and cumbersome endeavor.

FIGS. 10 and 11 show the wiring of the magnetic head 48 on the head transfer assembly 130. Normally, a magnetic head 48 comprises a slider 148 carrying at least one transducer 150 at the slider edge. In an inductive head, only two wires would come out of the head 48. In a magnetic head with both inductive and magnetoresistive elements, four wires would emanate from the head 48 ready for wiring. In this embodiment, the wires 152 sourcing out from the head 48 are soldered onto small paddle boards 154 which are insertable into receptacles 156. There are internal wirings inside the head transfer assembly 130 leading to pogo pins 158 (FIG. 11), which are in turn insertable onto a small printed circuit board on the floor of the slot 136 in the vertical slide 54 (FIG. 9).

Figure 12:
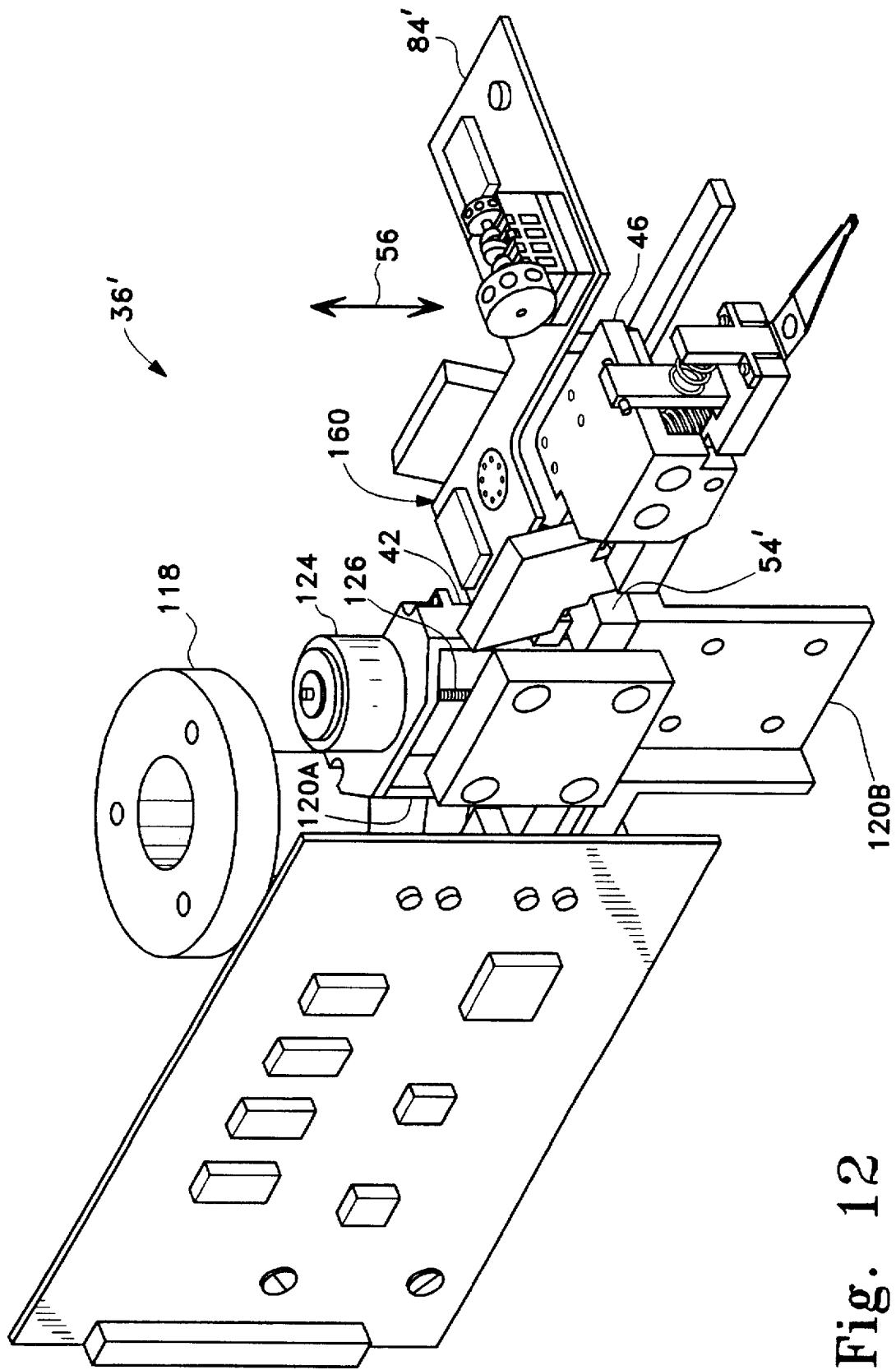
FIG. 12 is an isometric view of a second embodiment of an assembled rotatable arm.
Figure 13:
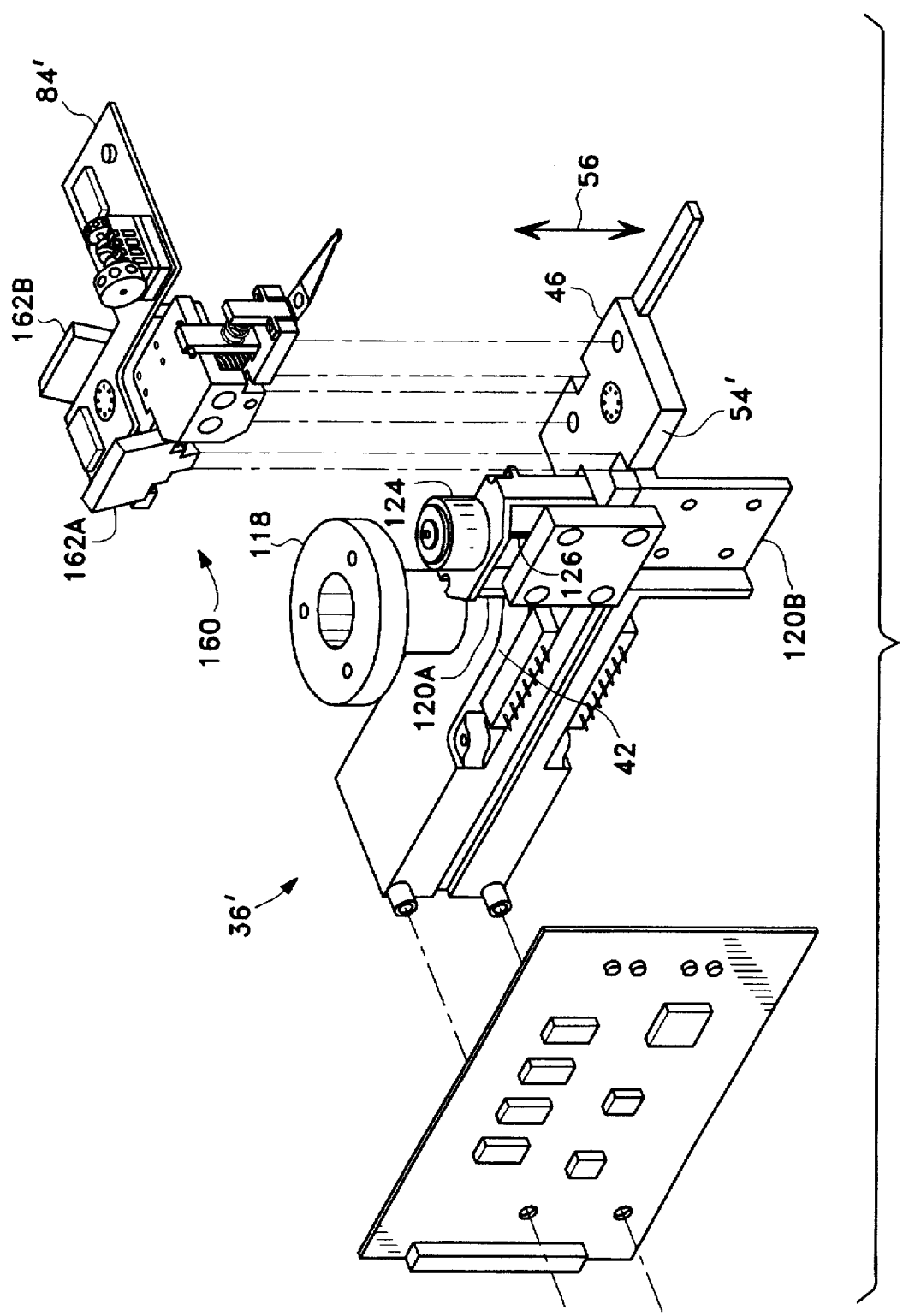
FIG. 13 is an exploded view of the rotatable arm shown in FIG. 12, illustrating a disengaged detachable module.
Figure 14:
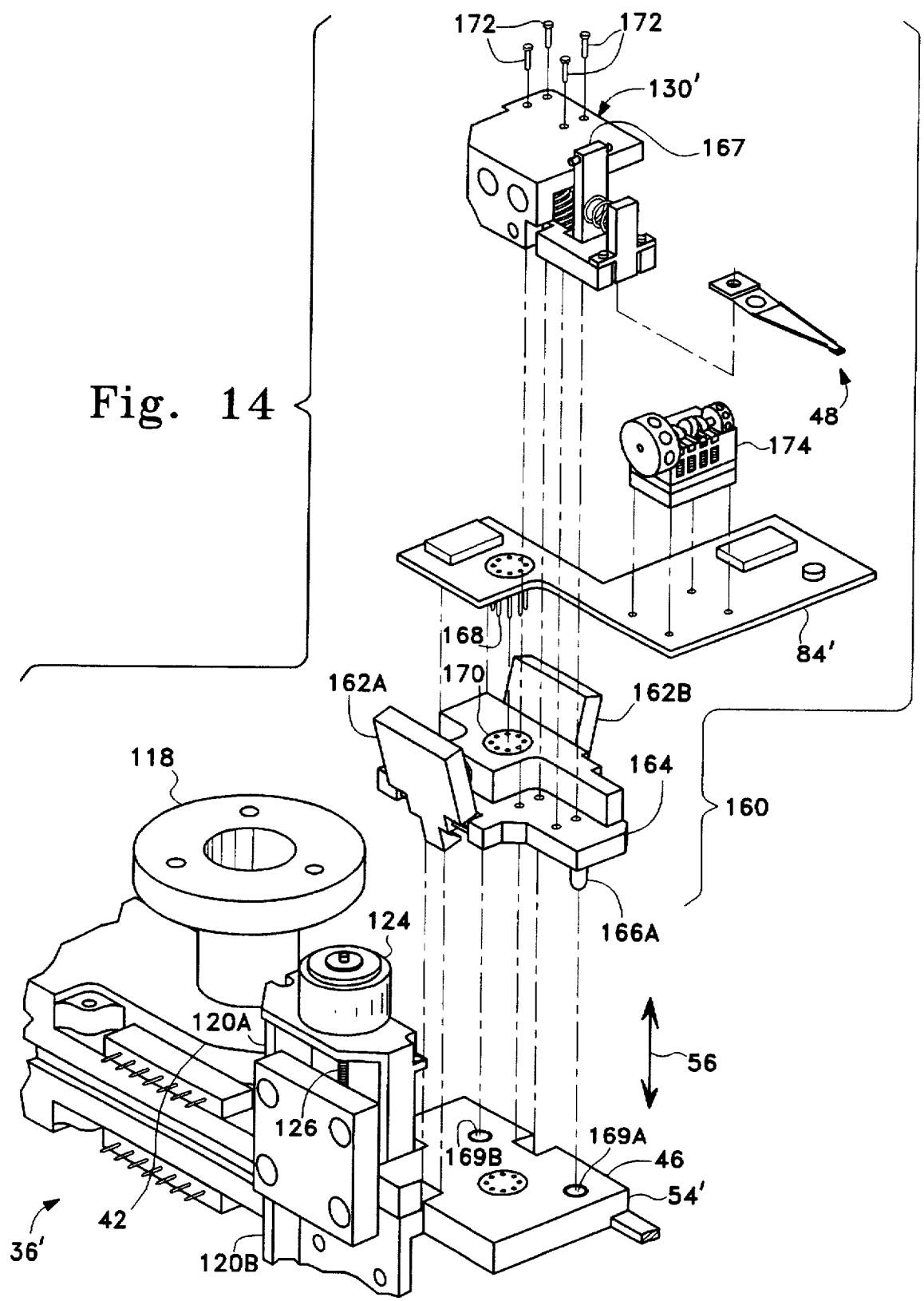
FIG. 14 is a exploded view of the detachable module shown FIGS. 12 and 13 illustrating the relevant parts of the detachable module.

To further curtail manual intervention and reduce tester downtime, a modular approach for component connectivity is adopted. FIGS. 12–14 show a second embodiment of the rotatable arm signified by reference numeral 36'. FIG. 12 is an assembled drawing of the arm 36' and FIGS. 13 and 14 are exploded views showing the relevant parts made up of the arm 36'.

As with the rotatable arm 36 of the first embodiment, the shaft coupler 118 is integrally affixed to the arm body 116 and the arm 36' has a distal end 46 and a proximal end 42. Optionally, a counterweight portion 50 can be joined to the proximal end 42 of the arm 36, for the purpose of balancing the rotational movement.

There are two flanges 120A and 120B integrally formed with the arm body 116. Shown in FIGS. 12–14 is the upper flange 120A attached to a lead screw housing 122 which encompasses a lead screw 126. The lead screw 126 has one end engaging a vertical slide 54' and another end connected to a stepper motor 124. When energized, the rotational movement of the stepper motor 124 spins the lead screw 126, which in turn drives the vertical slide 54' in a linear movement along the vertical direction 56. It should be appreciated that another similar vertical slide, similar to the slide 54', can also be assembled onto the lower flange 120B in a similar fashion carrying another magnetic head, such that two magnetic heads interact with a two-sided magnetic disk.

The distinctive feature of the arm 36' of this embodiment compared to the arm 36 of the previous embodiment is a detachable module 160 which is herein described.

The Detachable Module

FIG. 13 shows the detachable module 160 that is releasably attached to the distal end 46 of the rotatable arm 36'. There is a pair of hand grips 162A and 162B pivotally and resiliently attached to the module 160, which grips allow the module 160 to be releasably insertable onto the vertical slide 54'.

FIG. 14 is an exploded view of the detachable module 160, exposing the constituent parts in additional detail. The module 160 includes a module base 164 having hand grips 162A and 162B, and a pair of anchoring pins 166A and 166B (only one is shown in FIG. 14) insertable into the respective openings 169A and 169B formed in the vertical slide 54'. Atop the module base 164 are an amplifier board 84', and a head transfer assembly 130'. In this embodiment, the amplifier board 84' is attachable onto the module base 164 through a plurality of connector pins 168 insertable into openings 170 formed in the base 164. On the other hand, the head transfer assembly 130' is secured onto the base 164 via screws 172. The magnetic head 48 is securely latched under the head transfer assembly 130' via a grip (not shown) controlled by a lever 167. There is also a rotary wire connector 174 disposed on the top of the amplifier board 84' via soldering or screws. The fully assembled detachable module 160 is as shown in FIG. 12.

The advantage of integrating the components in the form of a module is multifold. To begin with, tester downtime is significantly reduced. The module 160 can be prepared and pre-wired before snapping onto the vertical slide 54'. There is no need to shut down the tester for magnetic head wiring, for example. In the event of repair or maintenance, the module 160 can be separately released without affecting the rest of the testing setup. Another pre-wired module 160 may be inserted as a replacement. The amplifier circuit 84' can be placed very close to the magnetic head 48 within the module 160. There is no need to extend long wirings from the magnetic head 48 to the amplifier circuit 84', thereby reducing the probability of noise occurrence.

It should be appreciated that in a production environment, a large quantity of magnetic heads or disks need to be tested and turned over within a short period of time. To aggravate the matters further, there are varieties of heads and disks of different sizes and specifications. With most prior art testers, considerable mounting, demounting and wiring steps are involved for change of test setup. The modular approach of preparing the tester in the present invention substantially facilitates the testing process.

The Rotary Wire Connector

The rotary wire connector 174 shown in FIGS. 12–14 is a device which is designed to alleviate the normally cumbersome wiring process.

Figure 15:
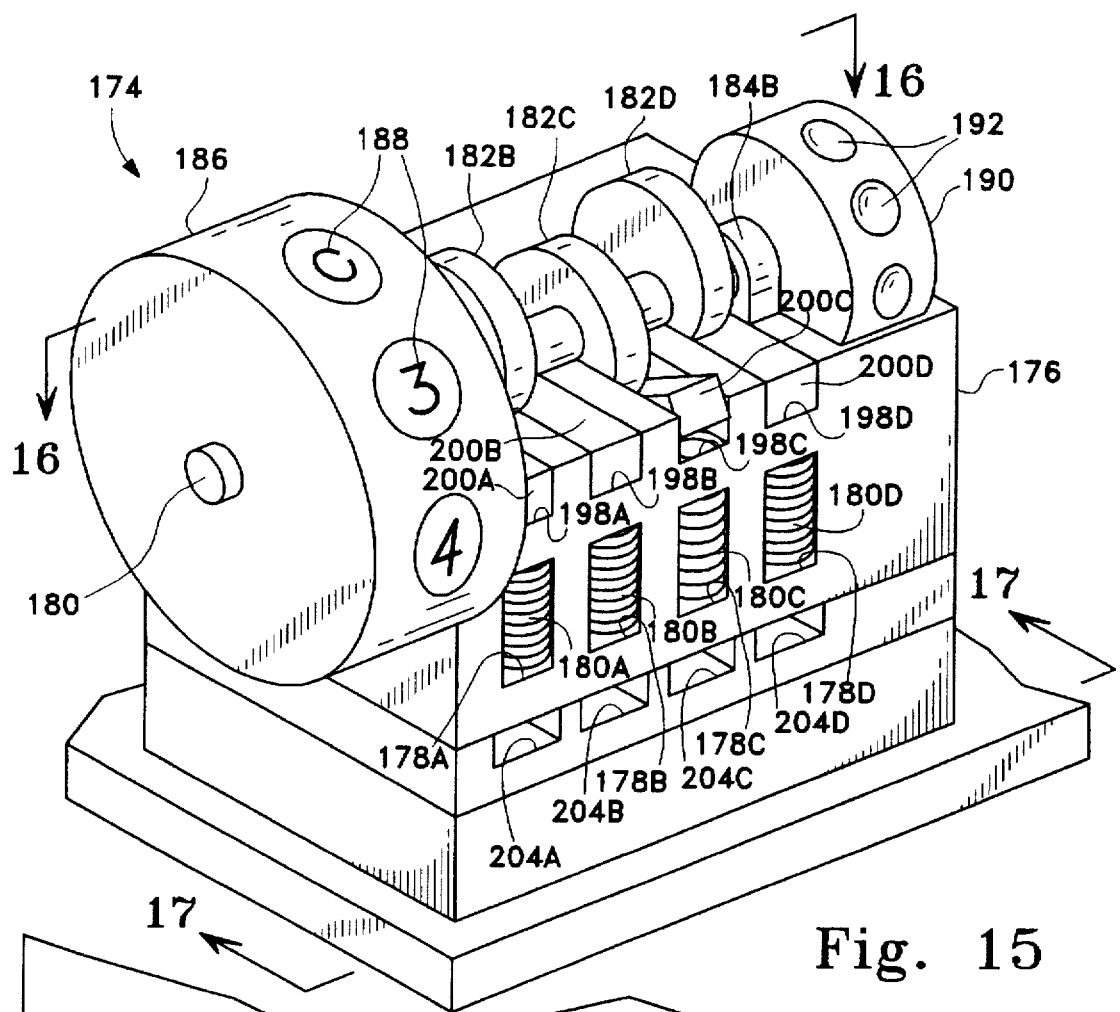
FIG. 15 is an isometric view of a rotary wire connector.
Figure 16:
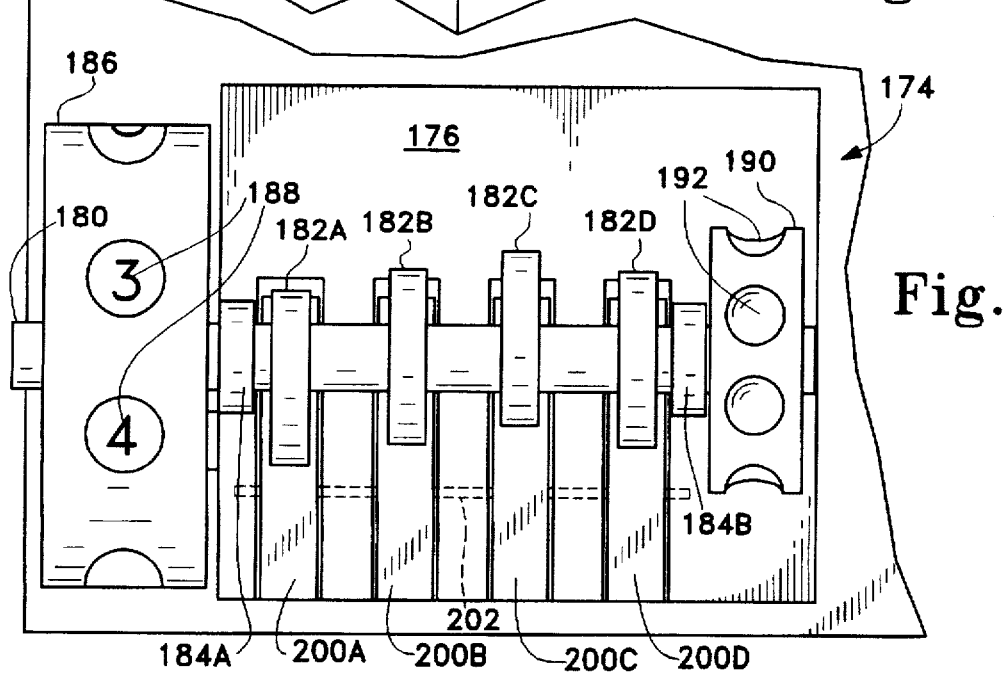
FIG. 16 is a top plan view of the rotary wire connector taken along line 16—16 of FIG. 15.
Figure 17:
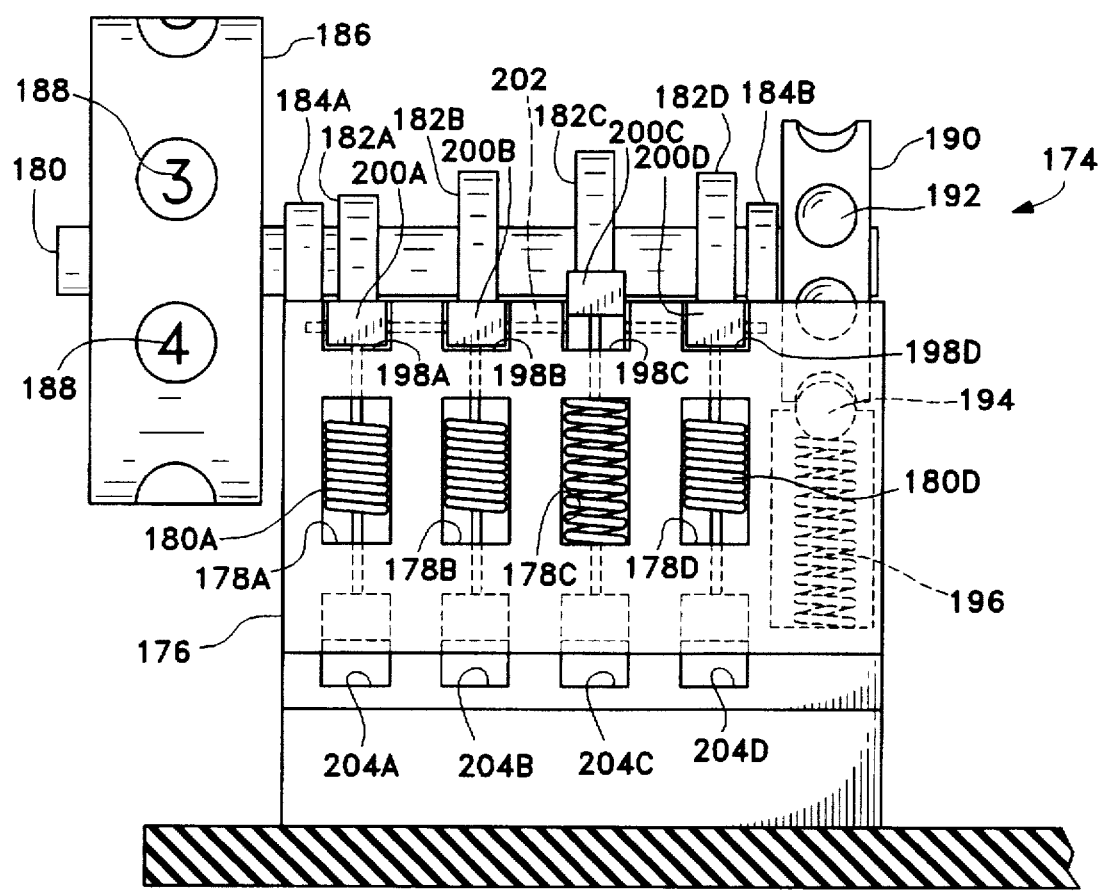
FIG. 17 is a front plan view of the rotary wire connector taken along line 17—17 of FIG. 15.

Shown in FIG. 15 is an enlarged perspective view of the connector 174. FIGS. 16 and 17 are top and side views taken along line 16—16 and 17—17 of FIG. 15, respectively. The wire connector 174 comprises a housing 176 having a plurality of wire openings 178A–178D. Springs 180A–180D are disposed inside the wire openings 178A–178D, respectively. Atop the housing 176 are a plurality of cams 182A–182D attached through a common shaft 180. The shaft 180 passes through sleeves 184A and 184B (FIG. 16) integrally joined to the housing 176. At one end of the shaft 180 is a thumb wheel 186 having indicating labels 188 marked thereon along the cylindrical wheel wall. At the other end of the shaft is a locking wheel 190 having a plurality of hemispherical cavities 192 on the cylindrical wheel wall. When the shaft 180 is rotated through the thumb wheel 186, the cavities 192 of the locking wheel 190 engage a ball bearing 194 and a spring 196 inside the housing 176 (FIG. 17), thereby enabling the shaft 180 to rotatably move in discrete steps.

At the top of the housing 176 is a plurality of slots 198A–198D accommodating a plurality of piano keys 200A–200D, respectively. The piano keys 200A–200D are pivotally attached though a common pin 202 inside the respective slots 198A–198D. For each of the piano keys 200A–200D, one end is pressed against one of the cams 182A–182D, and the other end is attached to one of the compression springs 180A–180D.

Figure 18:
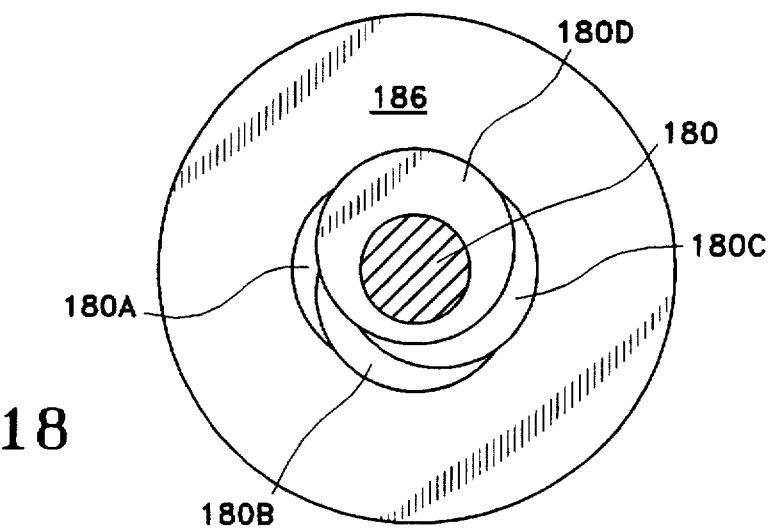
FIG. 18 is an end plan view of a plurality of cams mounted on the shaft of the wire connector of FIGS. 15–17.

FIG. 18 is an end view of the shaft 180 passing through the eccentric cams 182A–182D. When the thumb wheel 186 is rotated, the shaft 180 turns the eccentric cams 182A–182D simultaneously. The cams 182A–182D compress the piano keys 200A–200D one at a time, and accordingly stretch the compression springs 180A–180D one at a time, respectively. While each of the springs 180A–180D is stretched, bare wires can be inserted into spring windings in the respective openings 178A–178D for making electrical connections. The labeling 188 on the thumb wheel 186 indicates which of the springs 180A–180D is stretched, thereby facilitating the process of wiring. When none of the springs are stretched, all the wires would be tightly trapped in place. With this arrangement, wiring of the thin wires associated with a magnetic head is no longer a time consuming or cumbersome task.

There is also a plurality of paddle board openings 204A–204D formed in the housing 176. As an alternative, paddle boards linking to the magnetic head wires can be inserted into the openings 204A–204D, in lieu of the bare wire trapping in the springs 180A–180D. There are no fixture changes at all to make the transition.

The Translational and the Rotational Servomechanisms

With reference to FIGS. 3 and 4, there are two servomechanisms, namely, the linear servomechanism 32 and the rotational servomechanism 38 guiding the linear movement of the slide 28 and the rotational displacement of the arm 36, respectively. In the preferred embodiment, the servomechanisms 32 and 38 are respectively Model 3070 and Model 3035 servo positioning systems manufactured by CMX corporation of Wallingford, Connecticut.

Both servomechanisms 32 and 38 utilize the wavelength of light emitting from the respective coherent light sources as the basis of displacement measurement. Specifically, the servomechanisms 32 and 38 employ optical interferometers. The principle of operation of the optical interferometers is herein briefly described. As shown schematically in FIG. 3, inside the housing of the servomechanism 32, a Helium Neon (HeNe) laser diode L emits a coherent light with wavelength of approximately 810 nm (nanometers) along a path P1 toward an internal light splitter S. The light splitter S is essentially a partially silvered mirror allowing half of the light to pass through, that strikes an internal mirror M1 along a path P2 and reflects the other half which heads toward an external mirror M2 located inside the reflector 112 along a path P3. The split light rays are reflected. The reflected light rays from the mirrors M1 and M2 at the same time are directed toward a target T along the paths P4 and P5, respectively. As a consequence, a light interference pattern is formed on the target T which is an array of charge coupled devices. Different distances d of the mirror M2 disposed away from the servomechanism 32 generate different interference patterns on the target T. Since the mirror M2 is fixedly attached to the slide 28, the precise location of the slide 28 along the stationary platform 27 can be ascertained by interpreting the interference pattern on the target T.

Prior to usage, the servomechanism 32 needs to be calibrated. The calibration assembly 29 having the two lead screws 31A and 31B performs this duty. To begin with, the desired "home position" of the slide 28 must first be determined. This is accomplished by first turning the screw 31B to a location intended as the home position. The calibration extension 114 (also shown in FIG. 7) is then moved toward the calibration screw 31B until the extension 114 is in contact with the tip of the screw 31B. However, the extension 114 is fixedly attached to the slide 28. Therefore the slide 28 must also move along with the extension 114 to the home position. This position is then registered into the computer 66 as the designated home position.

Next, the "end position" of the slide 28 needs to be determined. This is achieved by placing a calibration block (not shown) of predetermined fixed length F between the tips of the screws 31A and 31B. The block is normally made of a material which is temperature compensated. That is, the coefficient of thermal expansion of the calibration block does not vary much over the operational temperature range. The screw 31A is then adjusted until both screws 31A and 31B snugly clamp the calibration block. Thereafter, the calibration block is removed. The slide 28 then advances toward the screw 31A until the calibration extension 114 is in contact with the tip of screw 31A. This position is then registered into the computer 66 as the end position of the slide 28.

With the home and end positions determined, any distance along the fixed distance F can be located via the calibrated servomechanism 32. During normal operation, suppose the slide 28 needs to be positioned at a certain distance along the fixed distance F. That distance is first registered as an input in the computer 66. The CPU 67 of the computer 66 directs the motor interface circuit 206 to advance the lead screw 37 a calculated number of revolutions (FIG. 4). Thereafter, the calibrated servomechanism 32 checks the advanced distance of the slide 28, in a manner as described above, against the inputted distance value. Should there be any discrepancies between the two values, the servomechanism 32 requests the CPU 67 to provide necessary corrections via the translational servomechanism interface circuit 78. The above described process repeats itself several times until an acceptable displacement tolerance is reached. In the preferred embodiment, the resolution of displacement of the slider 28 is accurate within a range of 6.33 nm.

With regard to the rotational servomechanism 34, the principle of operation is similar except rotational displacements are used to generate light interference patterns. Moreover, the calibration assembly in the form of angular internal stops is located inside the housing. Once the angular home position is determined, the rotational servomechanism 34 can be operated in the same manner as the linear servomechanism 32 as described above. For the sake of conciseness, the operational detail of the rotational servomechanism 34 is not further elaborated. The angular resolution of the rotatable arm in the preferred embodiment is accurate within a range of 0.125 µradians.

The Z-Height Adjustment Mechanism

Figure 19:
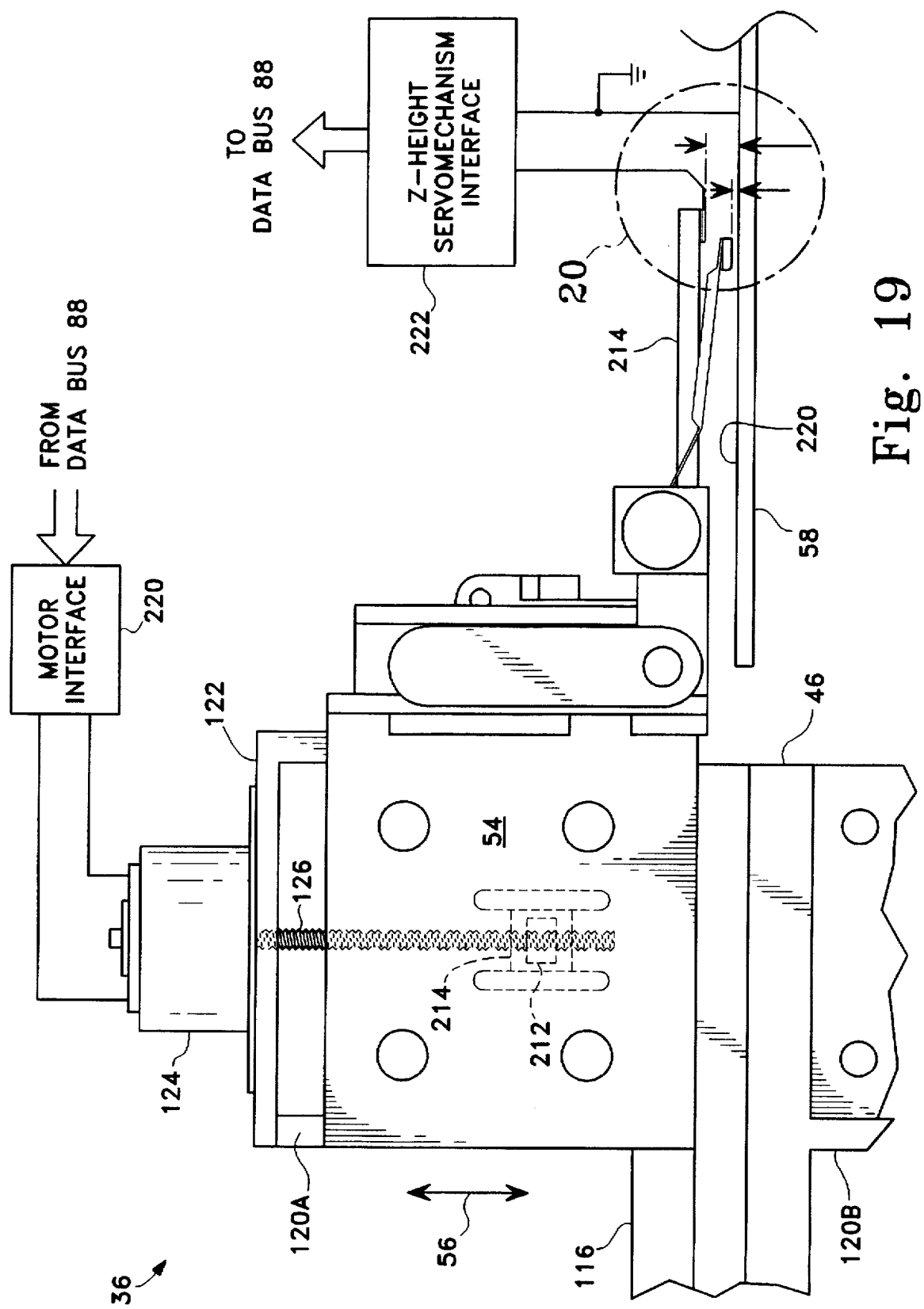
FIG. 19 is a side plan view of a vertical slide of the testing apparatus of the invention.

Another servomechanism is implemented in the testing apparatus 22 of the invention. FIG. 19 shows a side plan view of the distal end 46 of the rotatable arm 36. As described before, the lead screw housing 122 is fixedly attached to the flange 120A which is stationary with respect the arm body 116. At the top of the housing 122 is the stepper motor 124 which drives the lead screw 126 inside the housing 122. The lead screw 126 engages a nut 212 held by a bracket 214 fixedly secured on the back side of the vertical slide 54. By virtue of spinning the screw 126, the stepper motor 124 is capable of driving the vertical slide in a vertical direction 56 relative to the arm body 116.

Figure 20:
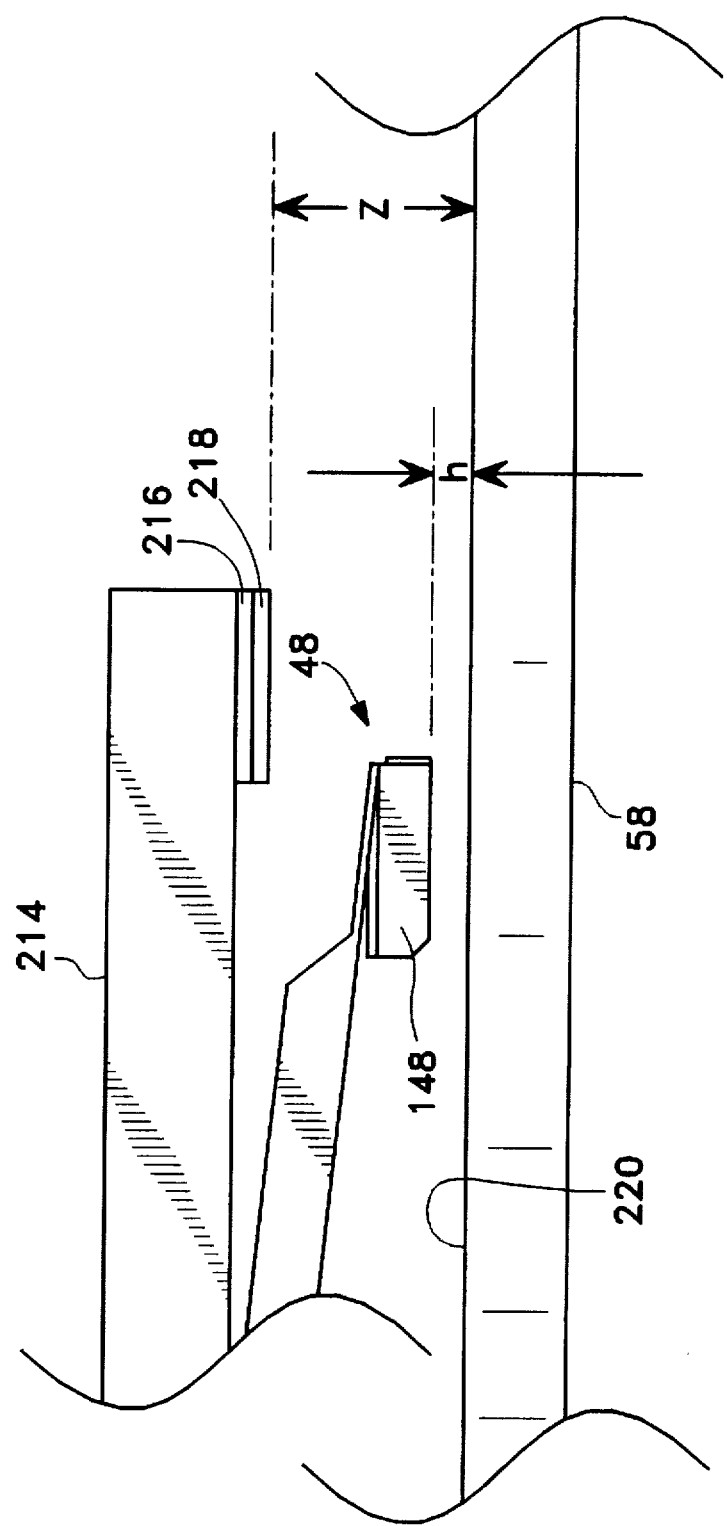
FIG. 20 is a supplementary view taken from the dot-dash circle identified as 20 shown in FIG. 19.

There is a sensor finger 214 integrally extended from the vertical slide 54. The sensor finger 214 follows the up-down motion 56 of the vertical slide 54 while the motor 124 is actuating the screw 126. FIG. 20 is a supplementary view taken from the dot-dash line circle identified as 20 shown in FIG. 19, showing the tip portion of the sensor finger 214 and the magnetic head 48 at a larger scale.

As shown in FIG. 20, near the distal end of the sensor finger 214 is a dielectric layer 216 sandwiched between the bottom surface of the finger 214 and a thin layer of conducting metal 218. The magnetic disk 58 is basically made of metal and is normally tied to ground potential. The thin metal layer 218 and the surface 220 of the magnetic disk 58 form an electrical capacitor with the metal layer 218 and the disk surface 220 acting as capacitor electrodes. As is well known in the art, capacitance value is inversely proportional to the distance between the electrodes. In the present case, the electrode distance is the displacement of the metal film 218 with respect to the disk surface 220. This distance is defined as the Z-height Z of the tester 22.

The Z-height Z should be distinguishable from the flying height h of the slider 148 above the disk surface 220. The flying height h of the slider 148 is dependent upon a number of aerodynamic parameters while the disk 58 is in spinning motion. However, the flying height h is related to the Z-height Z, which is essentially an arbitrary fixed reference point at the vertical slide 54 with respect to the disk surface 220. In the preferred embodiment, the Z-height Z is defined as the distance between the sensing metal film 218 and the disk surface 220.

To understand the feedback mechanism of the vertical slide 54, attention is now directed back to FIGS. 4 and 19. As with the translational servomechanism 32, a home position as reference needs first to be designated. Once the home position is determined, any distance above the disk surface 220 can be ascertained by evaluating the capacitance value formed between the metal film 218 and the metal disk 58. For example, suppose the vertical slide 54 needs to be positioned at a certain distance above the disk surface 220. This distance is fed into the computer 66. The CPU 67 of the computer 66 directs the motor interface circuit 220 to activate the motor 124 which in turn spins the lead screw 126 a calculated number of revolutions. Simultaneously, the lead screw 126 engages the nut 212 and moves the vertical slide 54 to the intended distance above the disk surface 220. Then, the Z-height servomechanism interface circuit 82 checks the capacitance value of the metal film 218 and the disk 58 at that particular location, and thereafter translates the capacitance value into a linear distance. Should there be any discrepancies between the inputted value and the detected value, the servomechanism 82 requests the CPU 67 to provide necessary corrections via the motor interface circuit 220. The above described process repeats itself several times until an acceptable tolerance is reached. In the preferred embodiment, the resolution of displacement of the vertical slider 54 is accurate within a range of 6.33 nm.

The Amplifier Circuit

Figure 21:
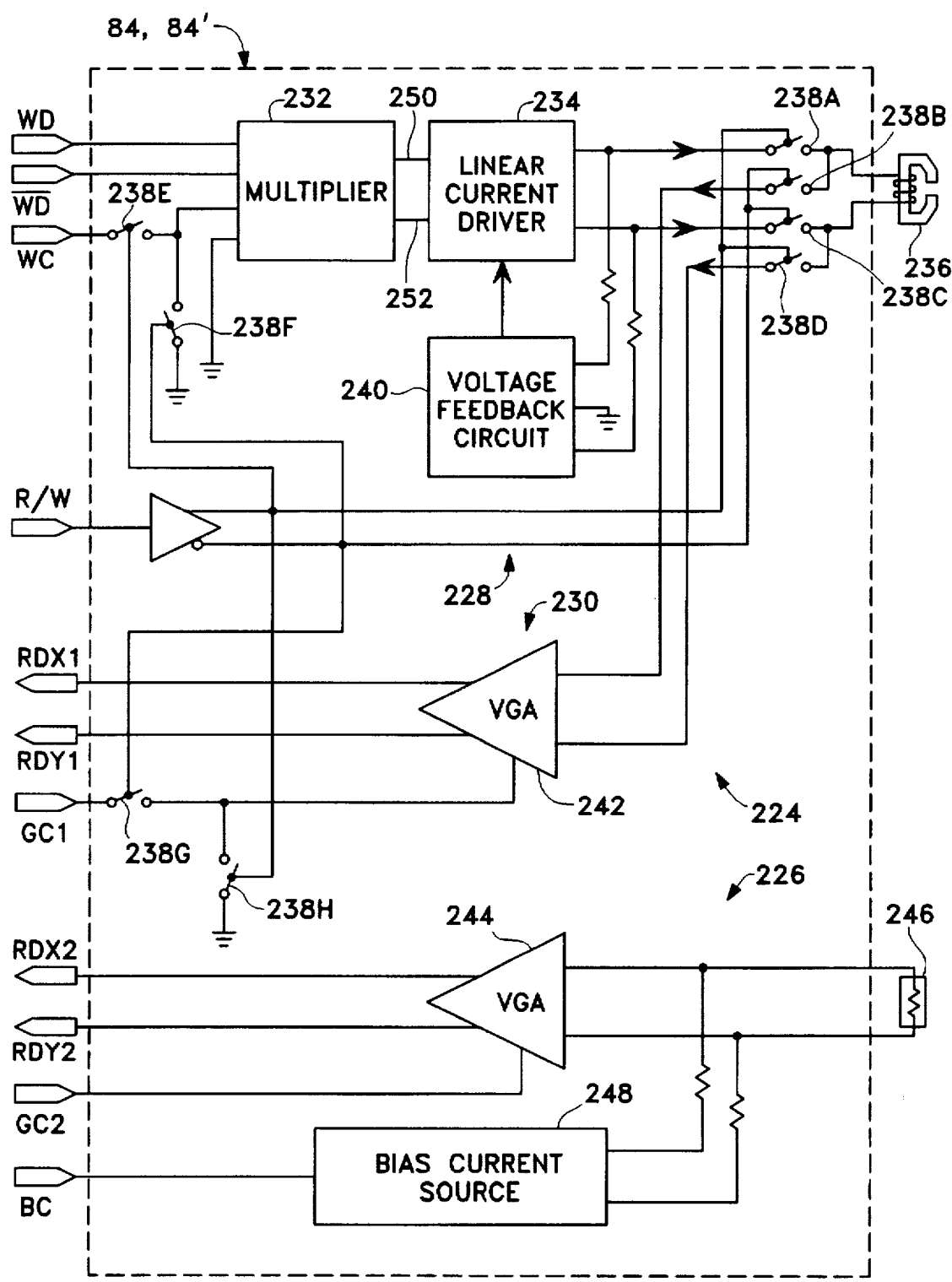
FIG. 21 is a block diagram schematic of the amplifier of the testing apparatus of the invention.

FIG. 21, which is an electrical block diagram of the amplifier circuit 84 or 84' mentioned previously, depicts the amplifier circuit 84 or 84' that can be partitioned into an inductive head circuit portion 224 and a magnetoresistive (MR) head circuit portion 226. Either one or all of the circuit portions 224 and 226 can be used during normal operation depending on applications.

The inductive head circuit portion 224 can be further divided into a data writing section 228 and a data reading section 230. The data writing section 228 includes a multiplier 232 driving a linear current drive 234 which is linked to an inductive head 236 through a plurality of switches 238A–238D. There is also a voltage feedback circuit 240 provided for output stabilization. The feedback circuit is coupled between the inductive head 236 and the linear current driver 234. The data reading section 230 includes a variable gain amplifier 242 tied to the inductive head 236.

The magnetoresistive head circuit portion 226 comprises another variable gain amplifier 244 connected to an MR head 246. There is also a bias current source 248 attached to the MR head 246 to provide bias current to the head 246 for orienting the head 246 into the proper operating region.

Figure 22:
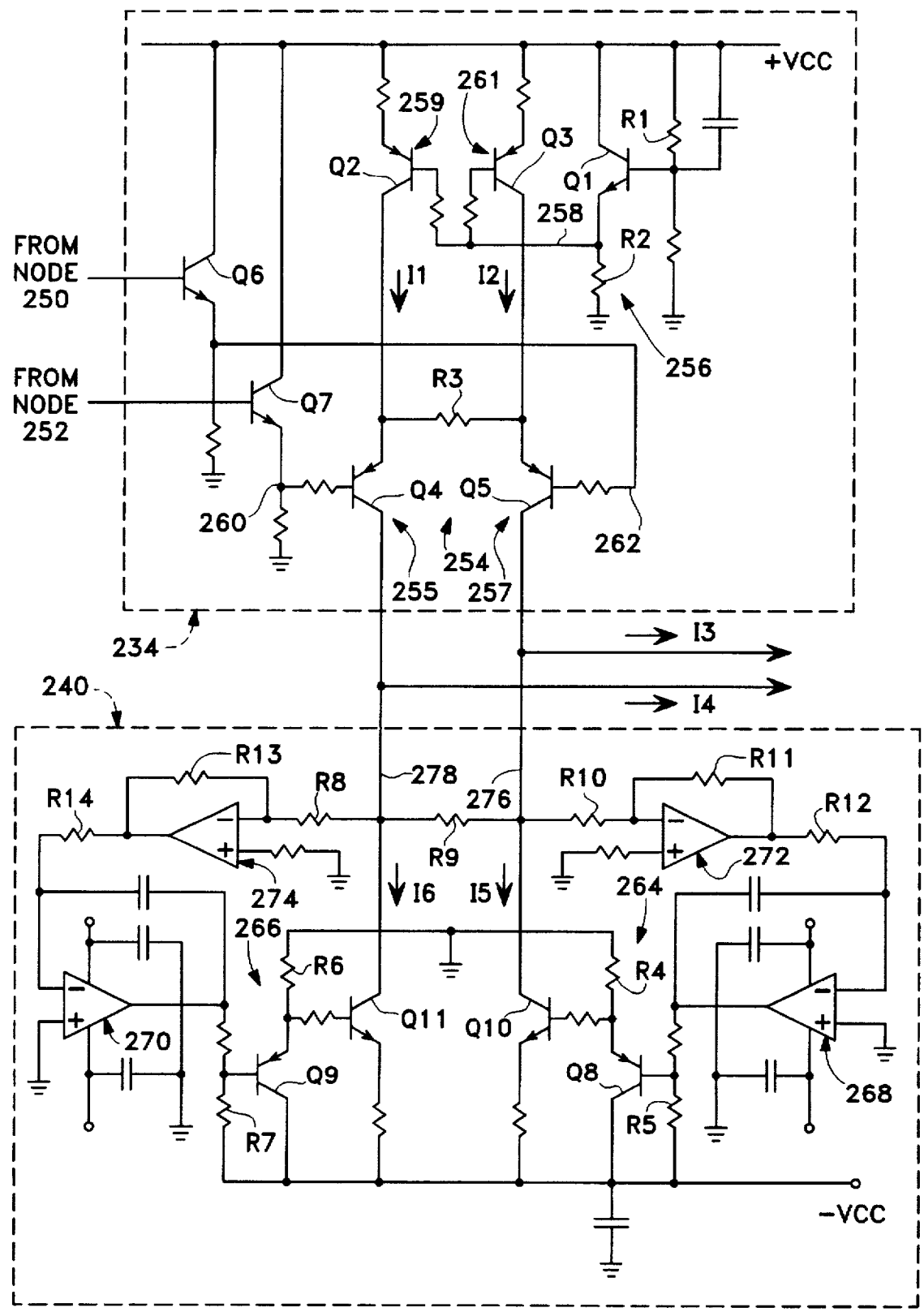
FIG. 22 is a circuit schematic of the linear current drive and the voltage feedback circuit shown in FIG. 21.

In the preferred embodiment, the multiplier 232 is a discrete component having a part number AD834, manufactured by Analog Devices, Inc. of Wilmington, Mass. The variable gain amplifier 242 is another discrete component having a part number NE/DA5209, manufactured by Philips Semiconductor of Eindhoven, the Netherlands. The detailed schematic of the linear current driver 234 and the voltage feedback circuit 240 are shown in FIG. 22. These two circuits are herein depicted along with the operational description of the inductive head circuit portion 224.

With reference to FIG. 21, during the data writing process, the read/write select input R/W is first activated. A high signal applied at the input R/W closes electrical switches 238A, 238C, 238E and 238H. Write data in true and complementary versions are then applied to the write data input WD and the write data complementary input $\overline{WD}$, respectively. Optionally, only the true version of the write data, that is, without the complementary version, can be supplied to the multiplier 232. At the same time, a DC voltage level is also tied to the write control input WC. As is well known in the art, a multiplier accepts multiple input signals and generates output signals as a product of the corresponding input signals. In this case, the output voltages $V_O$ and $V_{CO}$ of the multiplier 232 are made available at nodes 250 and 252, respectively, in accordance with the following equations:

$$V_O = K \times V_{WD} \times V_{WC} \quad (13)$$

$$V_{CO} = -(K \times V_{WD} \times V_{WC}) \quad (14)$$

where $V_{WD}$ and $V_{WC}$ are the voltages at the inputs WD and WC respectively, and K is a multiplier constant which is a function of the circuit parameters of the multiplier circuit 232 and is adjustable. Any type of logic levels, irrespective of whether the input signals are Emitter-Coupled Logic (ECL) or Transistor-Transistor Logic (TTL), can be applied to the amplifier circuit 84 or 84' via the inputs WD and $\overline{WD}$. The reason is because the DC voltage level at the write control input WC can scale the input signals via the multiplier 232 in accordance with the above mentioned equations (13) and (14) into proper voltage levels at the multiplier outputs 250 and 252 before processing.

FIG. 22 shows the internal structures of the linear current drive 234 and the voltage feedback circuit 240. The linear current drive 234 is essentially a differential amplifier 254 having an assertive circuit portion 255 which includes a transistor Q4, and a complementary circuit portion 257 which comprises a transistor Q5. A first voltage reference source 256, having a transistor Q1 and the resistors R1 and R2, is also installed adjacent to the differential amplifier 254. Current flowing through resistors R1 and R2 and the base-emitter junction of the transistor Q1 establishes a fixed voltage at the emitter node 258 of the transistor Q1. As a result, the voltage levels at the base-emitter junctions of transistors Q2 and Q3 are also fixed, yielding fixed collector currents I1 and I2, respectively. It should be noted that in contrast to most prior art amplifier circuits where only one current source is provided for the crosscoupled transistors in the differential amplifier, transistors Q2 and Q3 here act as dual current sources, namely, first and second current sources 259 and 261. Currents I1 and I2 from the first and second current sources 259 and 261, respectively, will proportionally steer into the transistors Q4 and Q5, depending on the respective base-emitter voltages of these two transistors. This feature of having double current sources 259 and 261 significantly increases the linear amplification range of the current drive 234.

Reference is now directed to the differential amplifier 254 in which the base-emitter voltages of the transistor Q4 and Q5 are controlled by the multiplier outputs 250 and 252 through emitter follower transistors Q6 and Q7, respectively. For the purpose of illustration, suppose the voltage at node 250 is low, and the complementary voltage at node 252 is high, the voltages at nodes 262 and 260 would follow the voltages at nodes 250 and 252 with the corresponding base-emitter junction drops of transistors Q6 and Q7, respectively. With the voltage potential at the base of transistor Q5 lower than that of the transistor Q4, the transistor Q5 is more actively turned on in comparison to the transistor Q4. Consequently, in addition to the current I2, a portion of the current I1 flows into transistor Q5 through the bridge resistor R3. The merged current is available as write current I3 passing to the magnetic head. However, the other current I4 associated with the magnetic head is sinking into the voltage feedback circuit 240.

In the voltage feedback circuit 240, there are a second voltage reference source 264 comprising a transistor Q8 and resistors R4 and R5, and a third voltage reference source 266 including a transistor Q9 and resistors R6 and R7. In a similar manner as the first voltage reference source 256, the voltages at the base-emitter junctions of transistors Q10 and Q11 are also determined by the emitter voltages of the transistors Q8 and Q9, respectively, yielding corresponding collector currents I5 and I6, respectively. However, the voltage potentials at the bases of the transistors Q8 and Q9 are not constant. Instead, these base potentials are dependent on the outputs of the first and second feedback amplifier stages 268 and 270, respectively, which are in turn driven by third and fourth feedback amplifier stages 272 and 274, respectively.

Returning now to the example illustrated above, with current driven out of the linear current driver 234 into the inductive head 236 (shown in FIG. 21), there is an ohmic drop across the inductive head 236. The ohmic drop is sensed by the third and fourth amplifier stages 272 and 274, respectively, at nodes 276 and 278. If the current driving out of the current driver 234 is I3, the voltage potential at the node 276 is higher in value than the voltage potential at the node 278. After passing the amplifier stages 268, 270, 272 and 274, the voltage potential at the base of the transistor Q9 would be driven higher in value in comparison to the voltage potential at the base of the transistor at Q8 as a result. After the emitter follower actions, the voltage potential at the base of the transistor Q11 is consequently higher in value than the corresponding base voltage potential for the transistor Q10. The transistor Q11 is therefore more actively turned on than the transistor Q10. That is, the collector current I6 is higher than the collector current I5. Therefore, the current direction for I4 shown in FIG. 22 should be reversed, or alternatively, the current value of the current I4 is negative. These push and pull actions of the currents I3 and I4 constitute the write current injecting into the inductive magnetic head 236 (FIG. 21). The voltage feedback circuit 240 also serves the regulating function of stabilizing the write current into the inductive magnetic head 236. The degree of feedback can be predetermined by adjusting the ohmic values of the resistors R11 and R12 in the third amplifier stage 272, and R13 and R14 in the fourth amplifier stage 274.

Variations of the Preferred Embodiment

The testing apparatus of the present invention provides the advantages of allowing fast testing setup changes and adjustments, minimizing human intervention and machine downtime, and equally as important, accuracy. All are of critical importance to production environments requiring high testing throughput.

Finally, other variations are possible within the scope of the invention. For example, the servomechanisms 32 and 38 need not be optical interferometers. Other feedback mechanisms, such as systems employing acoustics, can well be used as substitutes. The vertical servomechanism 52 need not be the type involving capacitance sensing. As an alternative, an optical interferometer can take its place. The detachable module 160 need not be releasably latched onto the vertical slide 54' through hand grips 162A and 162B. The detachable module 160 can well be attached to the vertical slide by other methods such as through screws, fastening or various other latching mechanisms. The cams 182A-182D can be fully encased within the housing 176. Moreover, the cams 182A-182D need not be circular, and the cams can have other shapes such as elliptical. In the current drive circuit 234 and the voltage feedback circuit 240 of the amplifier circuit 84 or 84', other types of transistors, such as complementary-metal-oxide-silicon (CMOS) transistors, can replace the bipolar transistors with minor circuit modification. These and other changes in form and detail may be made therein without departing from the scope and spirit of the invention as defined by the appended claims.

What is claimed is:

1. A testing apparatus for testing components of a disk drive including a magnetic head that interacts with a magnetic disk which includes a plurality of concentric data tracks magnetized thereon comprising:

a base;

translational means disposed above said base, said translational means being slidable in a longitudinal direction substantially parallel to the surface of said magnetic disk; a rotatable arm having a distal end attached to said magnetic head, and a proximal end pivotally connected to said translational means;

wherein said translational means and said rotatable arm respectively are operationally slidable and rotatable above said base, such that during testing, while accessing different data tracks on said magnetic disk, said translational means slides said rotatable arm and causes said magnetic head to rotate to different positions relative to the data tracks on said magnetic disk; and elevating means slidably connected to said distal end of said rotatable arm, said elevating means being slidable in a direction other than said longitudinal direction and substantially vertical to the surface of said magnetic disk, wherein said magnetic head is connected to said distal end of said rotatable arm by said elevating means, thereby allowing said elevating means to adjustably move said magnetic head relative to said magnetic disk.

2. The testing apparatus as set forth in claim 1 wherein said translational means further includes linear feedback means for allowing said translational means to adjustably move said rotatable arm along said longitudinal direction.

3. The testing apparatus as set forth in claim 2 wherein said linear feedback means includes an optical interferometer.

4. The testing apparatus as set forth in claim 1 wherein said rotatable arm includes rotational feedback means for allowing said rotatable arm to adjustably rotate said magnetic head above said magnetic disk.

5. The testing apparatus as set forth in claim 4 wherein said rotational feedback means includes an optical interferometer.

6. The testing apparatus as set forth in claim 1 wherein said elevating means includes linear feedback means for allowing said elevating means to adjustably move said magnetic head relative to said magnetic disk along a direction substantially vertical to the surface of said magnetic disk.

7. The testing apparatus as set forth in claim 6 wherein said linear feedback means includes capacitance sensing means.

8. The testing apparatus as set forth in claim 1 comprising a detachable module, having a module base, releasably attached to said distal end of said rotatable arm, wherein said magnetic head is attached to said rotatable arm via said detachable module, a magnetic head transfer mount disposed on said module base having said magnetic head attached thereto, and disposed on said module base, and an amplifier circuit proximally disposed adjacent to said transfer mount.

9. The testing apparatus as set forth in claim 8 wherein said amplifier circuit comprises a write data circuit, including a multiplier, and a current driver having input terminals connected to said multiplier and output terminals connected to said magnetic head.

10. The testing apparatus as set forth in claim 9 wherein said current driver includes a feedback circuit connected thereto for signal stabilization.

11. The testing apparatus as set forth in claim 9 wherein said amplifier circuit comprises at least one read data circuit, including a variable gain amplifier.

12. The testing apparatus as set forth in claim 8 wherein said detachable module includes a wire connector which comprises:

a housing;

at least one receiving opening formed in said housing;

at least one spring disposed in said receiving opening; and at least one cam attached to a shaft disposed adjacent to said housing, said cam being disposed adjacent to said opening for extending said spring at a predetermined rotational angle of said shaft, thereby allowing an electrical wire to be inserted into said spring at said predetermined rotational angle, and allowing said electrical wire to be compressively trapped in said spring and connected to said wire connector at other rotational angles of said shaft.

13. A testing apparatus for testing components of a disk drive including a magnetic head that interacts with a magnetic disk comprising:

first translational means linearly slidable in a first direction substantially parallel to the surface of said magnetic disk;

second translational means linearly slidable in a second direction substantially vertical to the surface of said magnetic disk, said second translational means having said magnetic head attached thereto; and a rotatable arm having a proximal end and a distal end, said proximal end of said arm being rotatably connected to said first translational means, said second translational means being slidably connected to said distal end of said arm;

wherein during testing, said first translational means linearly slides said rotatable arm along said first direction to a location proximal to said magnetic disk, and said rotatable arm pivotally rotates said second translational means to a predetermined angle above said magnetic disk, thereby allowing said second translational means to adjustably slide said magnetic head along said second direction at a predetermined height above said magnetic disk.

14. The testing apparatus as set forth in claim 13 wherein said first translational means includes a slide and said testing apparatus further includes a motor, and a lead screw having one end rotatably attached to said motor and another end movably engaging said slide, wherein said first translational means is linearly slidable by energizing said motor, thereby rotatably actuating said lead screw which engages and slidably moves said slide along said first direction.

15. The testing apparatus as set forth in claim 13 wherein said first translational means includes linear feedback means for allowing said translational means to adjustably move said rotatable arm along said first direction.

16. The testing apparatus as set forth in claim 15 wherein said linear feedback means includes an optical interferometer.

17. The testing apparatus as set forth in claim 13 wherein said rotatable arm includes rotational feedback means for allowing said rotatable arm to adjustably rotate said magnetic head above said magnetic disk.

18. The testing apparatus as set forth in claim 17 wherein said rotational feedback means includes an optical interferometer.

19. The testing apparatus as set forth in claim 13 wherein said second translational means includes linear feedback means for allowing said second translational means to adjustably move said magnetic head above said magnetic disk along said second direction.

20. The testing apparatus as set forth in claim 19 wherein said linear feedback means includes a capacitance sensor.

21. The testing apparatus as set forth in claim 13 further comprising a detachable module releasably attached to said second translational means, wherein said magnetic head is attached to the second translational means via said detachable module which includes a module base; a magnetic head transfer mount having said magnetic head attached thereto and disposed on said module base; and an amplifier circuit proximally disposed adjacent to said transfer mount on said module base.

22. The testing apparatus as set forth in claim 21 wherein said amplifier circuit comprises a write data circuit which includes a multiplier, and a current driver having input terminals connected to said multiplier and output terminals connected to said magnetic head.

23. The testing apparatus as set forth in claim 22 wherein said current driver comprises:

a differential amplifier having an assertive circuit portion and a complementary circuit portion;

a bridging circuit connected between said assertive and complementary circuit portions; and first and second current sources coupled to said assertive and complementary circuit portions respectively, such that current from said current sources flows into said circuit portions proportionally through said bridging circuit.

24. The testing apparatus as set forth in claim 22 wherein said current driver includes a feedback circuit connected thereto for signal stabilization.

25. The testing apparatus as set forth in claim 22 wherein said amplifier circuit comprises at least one data read circuit including a variable gain amplifier.

26. The testing apparatus as set forth in claim 13 wherein said detachable module includes a wire connector which comprises:

a housing;

at least one receiving opening formed in said housing;

at least one spring disposed in said receiving opening; and at least one cam attached to a shaft disposed adjacent to said housing, said cam being disposed adjacent to said opening for engaging said spring.

27. A testing apparatus for testing components of a disk drive including a magnetic head that interacts with a magnetic disk comprising:

a rotatable arm having a distal end and a proximal end, said proximal end being pivotally connected to said apparatus;

a vertical slide slidably attached to said distal end of said rotatable arm, said vertical slide being slidable in a direction substantially vertical to the surface of said magnetic disk;

sensing means attached to said vertical slide; and feedback means connected to said sensing means;

wherein during testing, said sensing means interacts with the surface of said magnetic disk and sends signals to said feedback means, thereby allowing said feedback means to adjustably slide said vertical slide along said vertical direction above the surface of said magnetic disk.

28. The testing apparatus as set forth in claim 27 comprising an amplifier circuit attached to said vertical slide, said amplifier circuit comprising:

a write data circuit having a multiplier; and a current driver having input terminals connected to said multiplier and output terminals connected to said magnetic head.

29. The testing apparatus as set forth in claim 28 wherein said current driver comprises:

a differential amplifier having an assertive circuit portion and a complementary circuit portion;

a bridging circuit connected between said assertive and complementary circuit portions; and first and second current sources coupled to said assertive and complementary circuit portions respectively, such that current from said current sources flows into said circuit portions proportionally through said bridging circuit.

30. The testing apparatus as set forth in claim 27 further comprising a detachable module having a module base, releasably attached to said vertical slide, said magnetic head being releasably attached to said module base, and an amplifier circuit proximally disposed adjacent to said magnetic head on said module base.

31. The testing apparatus as set forth in claim 30 wherein said detachable module includes a pair of hand grips resiliently attached thereto, said detachable module being releasably attached to said vertical slide via said hand grips gripping said vertical slide.

32. The testing apparatus as set forth in claim 27 wherein said rotatable arm includes a counterweight attached to said proximal end of said arm.

33. A testing apparatus for testing components of a disk drive including a magnetic head that interacts with a magnetic disk which includes a plurality of concentric data tracks, said apparatus comprising: a base;

a translational slide disposed above said base, said translational slide being linearly movable in a first direction substantially parallel to the surface of said magnetic disk;

a rotatable arm having a distal end and a proximal end, said proximal end of said arm being rotatably attached to said translational slide; and a vertical slide having said magnetic head attached thereto, said vertical slide being slidably attached to said distal end of said rotatable arm, and movable in a second direction substantially vertical to the surface of said magnetic disk;

wherein said translational slide, said rotatable arm and said vertical slide are operationally movable above said base, such that during testing, said translational slide linearly moves said rotatable arm along said first direction to a location proximal to said magnetic disk, and said rotatable arm pivotally rotates said vertical slide to a predetermined location above said magnetic disk, thereby allowing said vertical slide to adjustably move said magnetic head above the predetermined location along said second direction.

34. The testing apparatus as set forth in claim 33 wherein said translational slide includes a first optical interferometer, said rotatable arm includes a second optical interferometer, and said vertical slide includes a capacitance sensor.

35. The testing apparatus as set forth in claim 34 including a computer having an interface data bus, wherein said optical interferometers and said capacitance sensor electrically communicate with said computer via said interface data bus.

36. The testing apparatus as set forth in claim 35 comprising an amplifier circuit disposed adjacent to the vertical slide, wherein said amplifier circuit electrically communicates with said computer via said interface data bus, said amplifier circuit including:

a write data circuit having a multiplier; and a current driver having input terminals connected to said multiplier and output terminals connected to said magnetic head.

37. The testing apparatus as set forth in claim 36 wherein said current driver in said amplifier circuit comprises:

a differential amplifier having an assertive circuit portion and a complementary circuit portion;

a bridging circuit connected between said assertive and complementary circuit portions; and first and second current sources coupled to said assertive and complementary circuit portions respectively, such that current from said current sources flows into said circuit portions proportionally through said bridging circuit.

38. The testing apparatus as set forth in claim 37 comprising a detachable module releasably attached to said vertical slide, said detachable module including module base, a magnetic head transfer mount having said magnetic head attached thereto, said amplifier circuit being proximally disposed adjacent to said transfer mount on said module base.

39. The testing apparatus as set forth in claim 38 wherein said detachable module includes a wire connector which comprises:

a housing;

at least one receiving opening formed in said housing;

at least one spring disposed in said receiving opening; and at least one cam attached to a shaft disposed adjacent to said housing, said cam being disposed adjacent said opening for extending said spring at a predetermined rotational angle of said shaft, thereby allowing an electrical wire to be inserted into said spring at said predetermined rotational angle, and allowing the electrical wire to be compressively connected to said spring in said wire connector at other rotational angles of said shaft.

40. The testing apparatus as set forth in claim 38 wherein said detachable module includes a pair of hand grips resiliently attached thereto, said detachable module being releasably attached to said vertical slide via said hand grips securing said vertical slide.

41. A method of testing a disk drive including a magnetic head that interacts with a magnetic disk having a plurality of concentric data tracks registered thereon, wherein on each data track, the magnetic head spaces from the center of the data track at a radial distance and forms a skew angle with the tangent line to the data track, said method comprising the steps of:

disposing a translational slide above a stationary base and spaced from the magnetic disk;

providing a rotatable arm having a proximal end pivotally connected to said translational slide, and a distal end connected to the magnetic head;

deriving a first mathematical function defining a translational distance as a function of the skew angle, the radial distance and the geometrical relationships of said slide and said arm with respect to the magnetic disk;

deriving a second mathematical function defining a rotational angle as a function of the skew angle, the radial distance and the geometrical relationship of said slide and said arm with respect to the magnetic disk;

calculating said translational distance;

calculating said rotational angle;

sliding said first translational slide through said translational distance along a longitudinal direction;

rotating the magnetic head at said rotational angle; and conducting a test of said magnetic head that interacts with the magnetic disk.

42. The method of testing as set forth in claim 41 wherein said steps of calculating said translational distance and said rotational angle are performed by a computer.

43. A method of testing disk drive components including a magnetic head that interacts with a magnetic disk which includes a plurality of concentric data tracks registered thereon, said method comprising the steps of:

(a) slidably mounting a first translational slide linearly movable in a horizontal direction above a stationary base;

(b) providing a rotatable arm having a proximal end and a distal end;

(c) pivotally attaching the proximal end of said rotatable arm on said first translational slide;

(d) slidably mounting a second translational slide linearly movable in a vertical direction to said distal end of said rotatable arm, said second translational slide having said magnetic head attached thereto;

(e) sliding said first translational slide along said horizontal direction such that said rotatable arm is disposed adjacent to said magnetic disk;

(f) positioning said magnetic head above one of the data tracks registered on said magnetic disk by rotating said rotatable arm; and (g) sliding said second translational means in said vertical direction such that said magnetic head is disposed at a predetermined height above said magnetic disk.

44. The method of testing as set forth in claim 43 wherein on each data track, the magnetic head spaces from the center of the data track at a radial distance and forms a skew angle with the tangent line to the data track, and wherein step (e) further includes the sub-steps of:

(i) deriving a first mathematical function defining a translational distance as a function of the skew angle, the radial distance and the geometrical relationships of said slide and said arm with respect to the magnetic disk;

(ii) calculating said translational distance; and (iii) sliding said first translational slide through said translational distance along said horizontal distance.

45. The method of testing as set forth in claim 44 wherein step (f) further includes the sub-steps of:

(i) deriving a second mathematical function defining a rotational angle as a function of the skew angle, the radial distance and the geometrical relationships of said slide and said arm with respect to the magnetic disk;

(ii) calculating said rotational angle; and (iii) rotating said rotatable arm through said rotational angle.

* * * * *